(12) United States Patent
Luo et al.

(10) Patent No.: US 11,533,692 B2
(45) Date of Patent: Dec. 20, 2022

(54) DEVICE-TO-DEVICE SYNCHRONIZATION IN WIRELESS COMMUNICATIONS

(71) Applicant: QUALCOMM Incorporated, San Diego, CA (US)

(72) Inventors: Tao Luo, San Diego, CA (US); Sony Akkarakaran, Poway, CA (US); Jung Ho Ryu, Fort Lee, NJ (US); Junyi Li, Chester, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/899,438

(22) Filed: Jun. 11, 2020

(65) Prior Publication Data
US 2020/0396703 A1    Dec. 17, 2020

Related U.S. Application Data

(60) Provisional application No. 62/861,107, filed on Jun. 13, 2019.

(51) Int. Cl.
*H04W 76/11* (2018.01)
*H04W 72/04* (2009.01)
(Continued)

(52) U.S. Cl.
CPC ......... *H04W 56/001* (2013.01); *H04W 8/005* (2013.01); *H04W 24/10* (2013.01);
(Continued)

(58) Field of Classification Search
CPC ... H04W 8/005; H04W 24/10; H04W 56/001; H04W 72/042; H04W 72/046; H04W 76/11; H04W 76/14; H04W 92/18
(Continued)

(56) References Cited

U.S. PATENT DOCUMENTS

2017/0019886 A1    1/2017 Patel et al.
2017/0359714 A1    12/2017 Gupta et al.
(Continued)

FOREIGN PATENT DOCUMENTS

WO    WO-2018072521 A1    4/2018
WO    WO-2019059739 A1    3/2019

OTHER PUBLICATIONS

International Search Report and Written Opinion—PCT/US2020/037506—ISA/EPO—dated Jan. 11, 2021.
(Continued)

*Primary Examiner* — Harun Chowdhury
(74) *Attorney, Agent, or Firm* — Terry Tsai

(57) ABSTRACT

Methods, systems, and devices for wireless communications are described in which synchronization of one or more direct communications links between a user equipment (UE) and one or more other UEs is provided by one or more sidelink synchronization signals. The sidelink synchronization signals may include a first sidelink synchronization signal that provides a relatively coarse synchronization (e.g., providing rough timing information about the start of the orthogonal frequency division multiplexing (OFDM) symbol, without providing any information identifying the source of the signal) that may be used to identify a search space for a second sidelink synchronization signal that provides relatively fine synchronization (e.g., identifying more precisely the OFDM symbol boundaries) and an identifier of the device that is transmitting the sidelink synchronization signals.

30 Claims, 18 Drawing Sheets

(51) Int. Cl.
*H04W 56/00* (2009.01)
*H04W 24/10* (2009.01)
*H04W 74/08* (2009.01)
*H04W 8/00* (2009.01)
*H04W 92/18* (2009.01)

(52) U.S. Cl.
CPC ..... *H04W 72/046* (2013.01); *H04W 74/0833* (2013.01); *H04W 76/11* (2018.02); *H04W 92/18* (2013.01)

(58) Field of Classification Search
USPC .......................................... 370/329, 336, 350
See application file for complete search history.

(56) References Cited

U.S. PATENT DOCUMENTS

| | | | |
|---|---|---|---|
| 2017/0367087 A1 | 12/2017 | Seo | |
| 2019/0116571 A1* | 4/2019 | Yang | H04W 56/0015 |
| 2020/0045664 A1* | 2/2020 | Choi | H04W 72/046 |
| 2020/0092685 A1* | 3/2020 | Fehrenbach | H04W 72/042 |
| 2020/0304253 A1 | 9/2020 | Choi et al. | |
| 2021/0076236 A1* | 3/2021 | Kimura | H04W 24/10 |
| 2021/0219268 A1* | 7/2021 | Li | H04W 24/10 |

OTHER PUBLICATIONS

LG Electronics: "Discussion on Sidelink Synchronization Enhancement for PC5 Based V2V", 3GPP Draft, 3GPP TSG RAN WG1 Meeting #84bis, R1-162486, Discussion on Sidelink Synchronization Enhancement for PC5 Based V2V, 3rd Generation Partnership Project (3GPP), Mobile Competence Centre, 650, Route Des Lucioles, F-06921, Sophia-Antipolis Cedex, France, vol. RAN WG1, No. Busan, Korea, Apr. 11, 2016-Apr. 15, 2016, Apr. 2, 2016 (Apr. 2, 2016), XP051080223, 5 pages, Retrieved from the Internet: URL: http://www.3gpp.org/ftp/tsg_ran/WG1_RL1/TSGR1_84b/Docs/ [retrieved on Apr. 2, 2016] pp. 1-5.
Partial International Search Report—PCT/US2020/037506—ISA/EPO—dated Oct. 14, 2020.

* cited by examiner

Sidelink Synchronization Signal(s) 210

Configuration Information 220

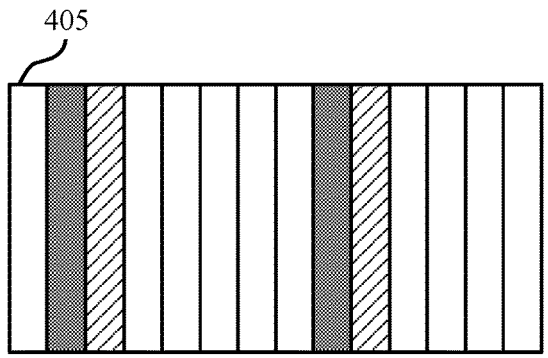
FIG. 4A
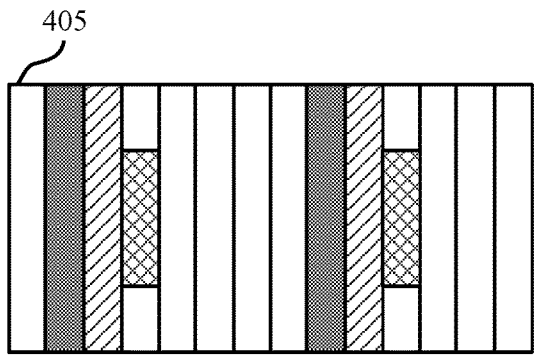
FIG. 4B
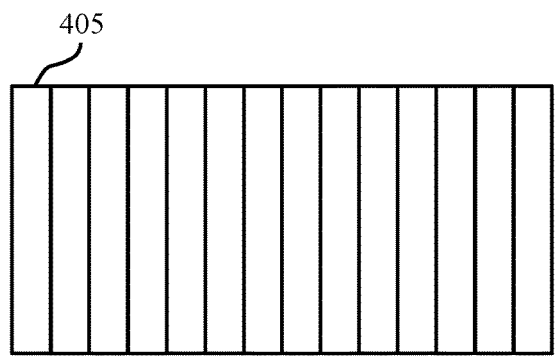
FIG. 4C
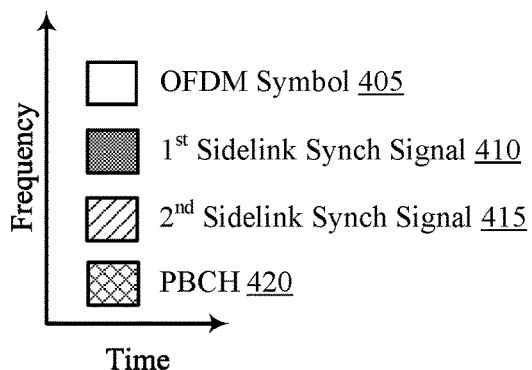

DEVICE-TO-DEVICE SYNCHRONIZATION IN WIRELESS COMMUNICATIONS

CROSS REFERENCE

The present Application for Patent claims the benefit of U.S. Provisional Patent Application No. 62/861,107 by Luo et al., entitled "DEVICE-TO-DEVICE SYNCHRONIZATION IN WIRELESS COMMUNICATIONS," filed Jun. 13, 2019, assigned to the assignee hereof, and expressly incorporated by reference in its entirety herein.

BACKGROUND

The following relates generally to wireless communications, and more specifically to device-to-device synchronization in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, such as distributed wireless networks, wireless devices (e.g., UEs) may directly communicate with each other (e.g., via device-to-device (D2D) communications or sidelink communications). In order to establish direct communications between devices, various types of information (e.g., identification information, timing information, resource configurations, and the like) may need to be exchanged. Efficient communication of such information may be help enhance system performance and reliability.

SUMMARY

The described techniques relate to improved methods, systems, devices, and apparatuses that support device-to-device synchronization in wireless communications. In some aspects of the disclosure, a wireless device (e.g., a user equipment (UE), vehicle, headset, or other wireless node) may establish one or more direct communications links (e.g., sidelink or D2D links) with one or more other wireless devices. In some cases, a transmitting device (e.g., a transmitting UE or transmitting vehicle) may transmit one or more sidelink synchronization signals, and a receiving device may determine synchronization information for exchanging communications with the transmitting device based on the sidelink synchronization signals. In some cases, the sidelink synchronization signals may include a first sidelink synchronization signal that provides a relatively coarse synchronization (e.g., providing only rough timing information about the start of an orthogonal frequency division multiplexing (OFDM symbol), without providing any information identifying the source of the signal) that may be used to identify a search space for a second sidelink synchronization signal that provides relatively fine synchronization (e.g., identifying more precisely the OFDM symbol boundaries) and an identifier of the device that is transmitting the sidelink synchronization signals. Based on the sidelink synchronization signals, the receiving device may determine synchronization information for communications with the transmitting device, and may transmit a request to establish a sidelink connection with the transmitting device.

In some cases, the first sidelink synchronization signal may be a first sounding reference signal (SRS) that is transmitted by a first UE, and the second sidelink synchronization signal may be a second SRS transmitted by the first UE. In some cases, the first SRS may have a first reference signal sequence that is selected from relatively few reference signal sequences (e.g., from two or three available sequences) and that are relatively easily identified at a second UE that may search for such a first SRS. In some cases, the second SRS may have a second reference signal sequence that is selected from a relatively large number of reference signal sequences, where the particular reference signal sequence of the second SRS provides an identifier associated with the first UE (e.g., a physical cell ID or virtual cell ID assigned to the first UE for purposes of sidelink communications, which may also be referred to as a sidelink ID). The second SRS may allow for the second UE to further refine synchronization information for sidelink communications with the first UE. Additionally, in some cases, the sidelink synchronization signals may include a broadcast channel (e.g., a physical broadcast channel (PBCH)) or control channel (e.g., a physical downlink control channel (PDCCH)) transmission that may provide system information associated with the first UE for establishing sidelink communications.

In some cases, the first sidelink synchronization signal may be a primary synchronization signal (PSS) that is transmitted by the first UE, and the second sidelink synchronization signal may be a secondary synchronization signal (SSS) transmitted by the first UE. In some cases, the PSS transmitted by the first UE may be selected from a number of available PSS sequences that are provided for synchronizing with a base station based on synchronization signal block (SSB) transmissions of the base station. Further, the SSS transmitted by the first UE may be selected from a number of available SSS sequences that are provided for synchronizing with the base station based on SSB transmissions of the base station. In some cases, a subset of PSS and SSS sequences may be provided for sidelink communications and the first UE may transmit one of the subset of PSS and SSS sequences that may be used for synchronization of sidelink communications. In some cases, new PSS and SSS sequences distinct from those used for establishing connections between base stations and UEs may be defined for the purpose of generating and transmitting sidelink synchronization signals.

BRIEF DESCRIPTION OF THE DRAWINGS

FIG. 4A through 4C illustrate examples of synchronization signal resources that support device-to-device synchronization in wireless communications in accordance with aspects of the present disclosure.

DETAILED DESCRIPTION

Figure 1:
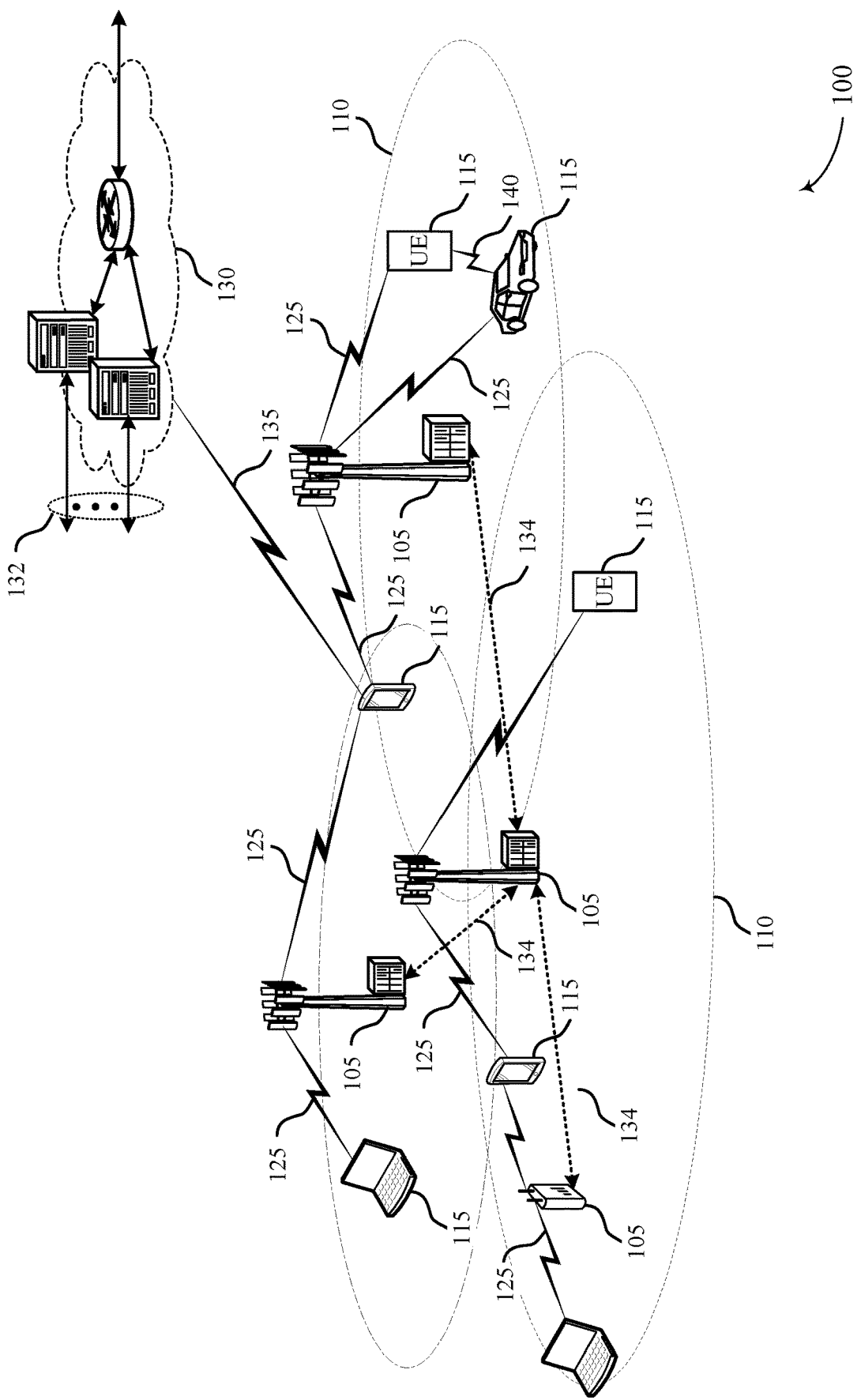
FIG. 1 illustrates an example of a system for wireless communications that supports device-to-device synchronization in wireless communications in accordance with aspects of the present disclosure.

Some wireless communication systems may be used to facilitate direct communications with various devices, which may include direct device-to-device (D2D) communications using sidelink communication links. For example, direct communications between vehicles may use sidelink communications, and these systems may sometimes be referred to as vehicle-to-everything (V2X) or vehicle-to-vehicle (V2V) communication systems. In other cases, various user equipment (UE) or other wireless nodes may be in proximity with one or more other UEs or wireless nodes (e.g., for virtual reality (VR) gaming type applications) such that direct communications between the devices may help reduce an amount of data that is transmitted through one or more base stations, and may thereby enhance system efficiency.

In various aspects of the disclosure, sidelink synchronization techniques may allow for multiple wireless devices (e.g., multiple UEs) to establish synchronized sidelink communications links. In some cases, a UE may establish one or more direct communications links (e.g., sidelink or D2D links) with one or more other wireless devices. In some cases, a transmitting UE may transmit one or more sidelink synchronization signals, and a receiving UE may determine synchronization information for exchanging communications with the transmitting UE based on the sidelink synchronization signals. While various examples provided herein discuss sidelink communications with UEs, techniques discussed herein may be used for any wireless devices that may establish direct sidelink communications.

In some cases, the sidelink synchronization signals may include a first sidelink synchronization signal that provides a relatively coarse synchronization (e.g., roughly at an orthogonal frequency division multiplexing (OFDM) symbol frame level without identifying the source transmitting the synchronization signals) that may be used to identify a search space for a second sidelink synchronization signal that provides relatively fine synchronization (e.g., at an OFDM symbol level) and an identifier of the transmitting UE. Based on the sidelink synchronization signals, the receiving UE may determine synchronization information for communications with the transmitting UE, and may transmit a request to establish a sidelink connection with the transmitting UE.

In some cases, the first sidelink synchronization signal may be a first sounding reference signal (SRS) that is transmitted by a first UE, and the second sidelink synchronization signal may be a second SRS transmitted by the first UE. In some cases, the first SRS may have a first reference signal sequence that is selected from relatively few reference signal sequences (e.g., from two or three available sequences) and that are relatively easily identified at a second UE that may search for such a first SRS. In some cases, the second SRS may have a second reference signal sequence that is selected from a relatively large number of reference signal sequences, where the particular reference signal sequence of the second SRS provides an identifier associated with the first UE (e.g., a physical cell ID, virtual cell ID, or sidelink ID assigned to the first UE for purposes of sidelink communications). The second SRS may allow for the second UE to further refine synchronization information for sidelink communications with the first UE. Such SRS techniques may be beneficial because existing UEs are already able to transmit SRS to base stations, and thus designing sidelink synchronization signals based on SRS will add relatively little additional UE transmitter complexity for sidelink support. Further UEs may also be equipped to receive SRS for the purpose of monitoring neighbor-cell uplink loading, or to monitor cross-link interference in dynamic time division duplexing (TDD) scenarios where the uplink and downlink slots or OFDM symbols are not aligned across neighboring cells. Thus, SRS-based sidelink synchronization signals may also add relatively little additional UE receiver complexity for sidelink support.

In other cases, the sidelink synchronization signals may also be based on other downlink reference signals, such as a channel state information reference signal (CSI-RS), which may take advantage of certain properties such as wider comb-spacings which are available with CSI-RS as compared with SRS. In this case, UEs can re-use existing CSI-RS components and techniques, and may use new functionality to transmit CSI-RS. Additionally or alternatively, in some cases, the sidelink synchronization signals may include a broadcast channel (e.g., a physical broadcast channel (PBCH)) or control channel (e.g., a physical downlink control channel (PDCCH) or physical uplink control channel (PUCCH)) transmission that may provide system information associated with the first UE for establishing sidelink communications. For UE-to-base station communications, existing UEs are equipped to receive PBCH, but do not transmit PBCH. Thus, in order to reuse existing UE architecture, the content normally carried on PBCH could instead be carried on other channels such as PDCCH, PUCCH, physical downlink shared channel (PDSCH), or physical uplink shared channel (PUSCH), to limit additional UE complexity for sidelink support.

Further, it is noted that in some cases, some of the component functions of synchronization signals realized by primary synchronization signals (PSS), secondary synchronization signals (SSS) and PBCH in access-link communications (e.g., UE-to-base station communications, or the Uu interface in NR) may be omitted in case of sidelink communications, by virtue of being provided by alternative mechanisms. For example, the sidelink-related PBCH payload information could be relayed directly from the base stations to the UEs participating in sidelink communications, thus avoiding the need for a sidelink PBCH. The sidelink PSS could be omitted by having the UEs acquire sidelink SSS directly, using the timing they have already acquired from their serving base-stations as a starting point for the sidelink SSS search. Further, which synchronization channels are transmitted and which are omitted may be altered dynamically, based on base station configuration, or for example, based on whether the UEs communicating on the sidelink are being served by the same or by different base stations.

In other cases, the first sidelink synchronization signal may be a PSS that is transmitted by the first UE, and the second sidelink synchronization signal may be an SSS transmitted by the first UE. In some cases, the PSS transmitted by the first UE may be selected from a number of available PSS sequences that are provided for synchronizing with a base station based on synchronization signal block (SSB) transmissions of the base station. Further, the SSS transmitted by the first UE may be selected from a number of available SSS sequences that are provided for synchronizing with the base station based on SSB transmissions of the base station. In some cases, a subset of PSS and SSS sequences may be provided for sidelink communications and the first UE may transmit one of the subset of PSS and SSS sequences that may be used for synchronization of sidelink communications. In some cases, new PSS and SSS sequences that are distinct from those used for access link connections between base stations and UEs may be defined for the purpose of generating and transmitting sidelink synchronization signals.

Such techniques may provide for relatively efficient determination of synchronization between sidelink devices, and may thus enhance reliability and efficiency of a sidelink communications system. Further, techniques discussed herein may use some signals or signal formats that are used for communications between base stations and UEs for sidelink communications, thus enhancing efficiency at the UEs by allowing processing and communications using techniques that are also used for communications with base stations.

Aspects of the disclosure are initially described in the context of a wireless communications system. Aspects of the disclosure are further illustrated by and described with reference to apparatus diagrams, system diagrams, and flowcharts that relate to device-to-device synchronization in wireless communications.

FIG. 1 illustrates an example of a wireless communications system 100 that supports device-to-device synchronization in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support sidelink (e.g., D2D or V2X communications) between UEs 115 via a sidelink communications link 140. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

Wireless communications system 100 may support direct communication between UEs 115 over a sidelink communications link 140 (e.g., using a peer-to-peer (P2P), D2D protocol, or V2X protocol). Sidelink communication may be used for D2D media-sharing, V2V communication, V2X communication (or cellular V2X (cV2X) communication), emergency rescue applications, etc. One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), TDD, or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. In cases where D2D or V2X communications are used via sidelink communications link 140, a D2D or V2X layer may provide related protocols, and in some cases, may use ProSe direct communications protocols (e.g., PC5 signaling). A Radio Link Control (RLC) layer may, in some cases, perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

In some cases, two or more UEs 115 may establish direct connections (e.g., via sidelink communications link 140) in which timing synchronization is established based on one or more sidelink synchronization signals that may be transmitted by a transmitting UE 115.

In some cases, the sidelink synchronization signals may include a first sidelink synchronization signal that provides a relatively coarse synchronization (e.g., a rough identification of OFDM symbol boundaries without identifying the device transmitting the signal) that may be used to identify a search space for a second sidelink synchronization signal that provides relatively fine synchronization (e.g., identifying more precisely the OFDM symbol boundaries) and an identifier of the transmitting UE. Based on the sidelink synchronization signals, the receiving UE may determine synchronization information for communications with the transmitting UE, and may transmit a request to establish a sidelink connection with the transmitting UE.

Figure 2:
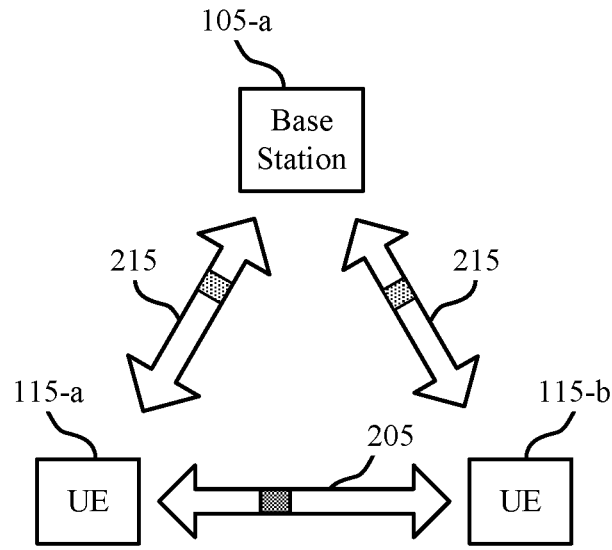
FIGS. 2 and 3 illustrate examples of a portion of a wireless communications system that support device-todevice synchronization in wireless communications in accordance with aspects of the present disclosure.

FIG. 2 illustrates an example of a wireless communications system 200 that supports device-to-device synchronization in wireless communications in accordance with aspects of the present disclosure. In some examples, wireless communications system 200 may implement aspects of wireless communications system 100. Wireless communications system 200 may include a base station 105-*a*, a first UE 115-*a*, and a second UE 115-*b*, which may be examples of corresponding devices in wireless communications system 100. It is noted that communications between two UEs 115 are illustrated in wireless communications system 200 for the sake of brevity, and the techniques described below may be applicable to multiple UEs 115 within a system.

In some cases, UEs 115 may establish an access link 215 with the base station 105-*a* (e.g., a Uu interface as defined in LTE or NR), and may establish a sidelink communications link 205 with each other. The sidelink communications link 205 may be a direct connection that does not go through the base station 105-*a*. In some examples, UEs 115 may execute one or more sets of codes or sequences, to control the functional elements of the device, and perform some or all of the functions described herein. In some cases, a communications manager at each UE 115 may manage sidelink communications and synchronization parameters used in the sidelink communications link 205. While various examples described herein illustrate D2D communications using NR between UEs 115, it will be understood that techniques provided herein may be used in other communications systems that may use different radio access technologies and communications protocols.

In some examples, a base station 105-*a* may communicate with first UE 115-*a* and the second UE 115-*b* via bidirectional access links 215 in a geographic coverage area. Base station 105-*a* may, for example, grant resources for sidelink communication via sidelink communications link 205 to one or more UEs 115 (e.g., UE 115-*a* and UE 115-*b*). The first UE 115-*a* and second UE 115-*b* may perform sidelink communications on granted sidelink resources. In some cases, the base station 105-*a* may transmit configuration information 220 via the access links 215 to the first UE 115-*a* and the second UE 115-*b*.

In some cases, the first UE 115-*a* may transmit one or more sidelink synchronization signals 210 to the second UE 115-*b* (and in some cases, one or more other UEs) that may be used for timing synchronization that is used for establishing the sidelink communications link 205. In some cases, the sidelink synchronization signals 210 may include a first sidelink synchronization signal that provides a relatively coarse synchronization that may be used to identify a search space for a second sidelink synchronization signal that provides relatively fine synchronization and an identifier of the first UE 115-*a*. Based on the sidelink synchronization signals, the second UE 115-*b* may determine synchronization information for communications with the first UE 115-*a*, and may transmit a request to establish a sidelink connection with the first UE 115-*a*.

In some cases, the first sidelink synchronization signal may be a first SRS that is transmitted by the first UE 115-*a*, and the second sidelink synchronization signal may be a second SRS transmitted by the first UE 115-*a*. In some cases, the first SRS may have a first reference signal sequence that is selected from relatively few reference signal sequences (e.g., from two or three available sequences) and that are relatively easily identified at the second UE 115-*b* that may search for such a first SRS. In some cases, the second SRS may have a second reference signal sequence that is selected from a relatively large number of reference signal sequences, where the particular reference signal sequence of the second SRS provides an identifier associated with the first UE 115-*a* (e.g., a physical cell ID or virtual cell ID assigned to the first UE 115-*a* for purposes of sidelink communications). The second SRS may allow for the second UE 115-*b* to further refine synchronization information for sidelink communications with the first UE 115-*a*. Additionally, in some cases, the sidelink synchronization signals 210 may include a broadcast channel (e.g., a PBCH) transmission that may provide system information associated with the first UE 115-*a* for establishing the sidelink communications link 205.

In other cases, the first sidelink synchronization signal may be a PSS that is transmitted by the first UE 115-*a*, and the second sidelink synchronization signal may be an SSS transmitted by the first UE 115-*a*. In some cases, the PSS transmitted by the first UE 115-*a* may be selected from a number of available PSS sequences that are provided for synchronizing with the base station 105-*a* based on SSB transmissions of the base station 105-*a*. Further, the SSS transmitted by the first UE 115-*a* may be selected from a number of available SSS sequences that are provided for synchronizing with the base station 105-*a* based on SSB transmissions of the base station 105-*a*. In some cases, a subset of PSS and SSS sequences may be provided in the configuration information 220 for sidelink communications and the first UE 115-*a* may transmit one of the subset of PSS and SSS sequences that may be used for synchronization of sidelink communications link 205. For example, the base station 105-*a* may configure a PSS sequence, and a set of SSS sequences in a specific range or a selected set physical cell IDs or virtual cell IDs, for use as the sidelink synchronization signals 210. Accordingly, one or more synchronization signals may be used for sidelink synchronization signals 210, such as one or a combination of a PSS, an SSS, a PBCH (e.g., that is transmitted using DFT-s-OFDM or CP-OFDM), a CSI-RS, a control channel signal (e.g., a PDCCH signal), or a shared channel signal (e.g., a PDSCH or PUSCH signal, which may also be transmitted using DFT-s-OFDM or CP-OFDM).

In some cases, the UEs 115 and, the base station 105, or both may use beamformed wireless communications, in which one or more beams may be identified for use in the sidelink communications link 205. In some cases, beam index information may be provided by the base station 105-a in the configuration information 220 that identifies one or more beams (e.g., a range of beams within 64 available beams in frequency range two (FR2) above 6 GHz, or one or more beams within four or eight available beams in frequency range one (FR1) below 6 GHz). In some cases, a bit mask-based signaling may be used to signal beam or quasi-co-location (QCL) related information for the sidelink synchronization signals 210, such that the second UE 115-b monitors for the sidelink synchronization signals 210 on the identified beams. In some cases, a synchronization raster may be provided that indicates frequency ranges for locations where the sidelink synchronization signals 210 are transmitted. In some cases, such a synchronization raster may be adjusted over time (e.g., based on UE 115 movement, a number of UEs 115 present that may participate sidelink operations at a given region/location, or scheduling considerations of the base station 105-a).

In some cases, the second UE 115-b may identify the sidelink synchronization signals 210 and may transmit a connection request to the first UE 115-a to establish the sidelink communications link 205. In some cases, the connection request may be transmitted using one or more identified resources that are configured for connection request transmissions to the first UE 115-a. In some cases, one or more random access channel (RACH) resources may be allocated for sidelink connection requests. In some cases, some RACH resources may be associated with one or more beams, and such a resource and its QCL association may have associated sidelink synchronization signals 210. This association may itself be conveyed in the sidelink PBCH, or in sidelink system information block (SIB) transmissions (analogous to SIB1 carrying remaining minimum system information (RMSI) for the Uu interface in NR), or may be conveyed directly by the serving base station. Additionally or alternatively, the base station 105-a may configure a specific time window for device discovery and measurement for a specific device or groups of devices, such as UEs 115. In such cases, the UEs 115 may perform synchronization during the specific time windows, which may have associated beams and sidelink synchronization signals. In some cases, the first UE 115-a may indicate to the base station 105-a or the second UE 115-b, or both that the sidelink synchronization signals 210 are to be changed. For example, the first UE 115-a may signal a change of sidelink synchronization signals 210 in terms of QCL related parameters of the first UE 115-a (e.g., beam direction or transmit timing). In some cases, the first UE 115-a may indicate its mobility state (e.g., fixed, moving, rotating, or combinations thereof) to the base station 105-a or the second UE 115-b (e.g., directly or through the base station 105-a), and the mobility state may be used to determine one or more of the sidelink synchronization signals 210. For example, the base station 105-a may configure some SSS sequences for high mobility cases, and some other SSS sequences for low mobility cases, or some RACH resources may be identified based on mobility.

Such synchronization techniques may allow for sidelink communications on the sidelink communications link 205 to be synchronized, such that the second UE 115-b may determine when some transmissions are to be received from the first UE 115-a. Further, the second UE 115-b may use the synchronization information to transmit communications to the first UE 115-a that are aligned with time boundaries at the first UE 115-a.

Figure 3:
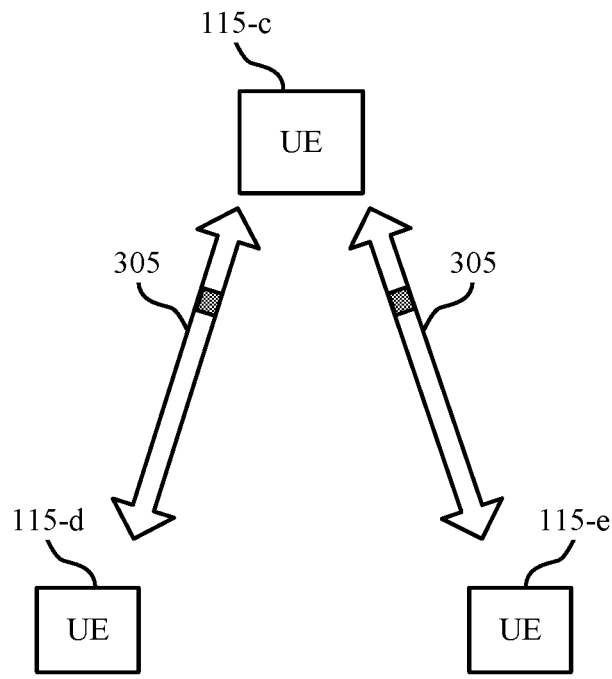

FIG. 3 illustrates an example of a wireless communications system 300 that supports device-to-device synchronization in wireless communications in accordance with aspects of the present disclosure. In some examples, wireless communications system 300 may implement aspects of wireless communications system 100 or 200. In this example, a first UE 115-c may communicate directly with a second UE 115-d and a third UE 115-e via sidelink communication links 305.

In this example, the first UE 115-c may transmit sidelink synchronization signals 310 that are received at each of the second UE 115-d and the third UE 115-e, and that may be used to synchronize communications between the UEs 115. In some cases, the first UE 115-c may receive configuration information from a base station (e.g., a base station 105 of FIGS. 1 or 2) that configures one or more reference signal sequences (e.g., one or more SRS sequences) or one or more synchronization signal sequences (e.g., one or more PSS/SSS sequences) for use as the sidelink synchronization signals 310. In this example, the first UE 115-c may transmit one or more indications to the second UE 115-d or the third UE 115-e, or both that may indicate information associated with configuration or updated configuration for sidelink synchronization signals 310.

FIGS. 4A through 4C illustrate examples of synchronization signal resources 400 that support device-to-device synchronization in wireless communications in accordance with aspects of the present disclosure. In some examples, synchronization signal resources 400 may implement aspects of wireless communications system 100, 200, or 300.

In the example of FIG. 4A, synchronization signal resources 400-a may include a number of OFDM symbols 405, in which some of the OFDM symbols 405 are configured for synchronization signal transmissions. In this example, a first sidelink synchronization signal 410 and a second sidelink synchronization signal 415 may be configured in a signal structure to be transmitted in adjacent OFDM symbols 405 within the synchronization signal resources 400-a. In some cases, a synchronization signal configuration may be provided that indicates the resources that are configured for the first sidelink synchronization signal 410 and the second sidelink synchronization signal 415.

In some cases, a predetermined set of available synchronization signal resources may be available, and the synchronization signal configuration may indicate which resources of the set of available synchronization signal resources are to be used for sidelink synchronization signals. For example, the synchronization signal configuration may provide an index value that may be mapped to particular synchronization signal resources that are to be used for the first sidelink synchronization signal 410 and the second sidelink synchronization signal 415. Further, in some cases, such an index value may also be mapped to particular reference signal sequences (e.g., SRS sequences) or synchronization signal sequences (e.g., PSS/SSS sequences) that are to be used for the first sidelink synchronization signal 410 and the second sidelink synchronization signal 415. Additionally or alternatively, the synchronization signal configuration may provide (e.g., based on a mapping to an index value) beam index information or raster scan information that are to be used for the first sidelink synchronization signal 410 and the second sidelink synchronization signal 415.

In some cases, as illustrated in FIG. 4B, synchronization signal resources 400-*b* may include a number of OFDM symbols 405, in which some OFDM symbols 405 are also configured for PBCH 420 transmissions. In this example, first sidelink synchronization signal 410 and a second sidelink synchronization signal 415 may be configured in a signal structure to be transmitted in adjacent OFDM symbols 405 as with FIG. 4A, and the PBCH 420 transmissions may be in an OFDM symbol 405 that is adjacent to the second sidelink synchronization signal 415. In some cases, a synchronization signal configuration may be provided that indicates the signal structure of the synchronization signal resources 400-*b* that are configured for the first sidelink synchronization signal 410, the second sidelink synchronization signal 415, and the PBCH 420 transmission. In some cases, the signal structure may indicate the number of symbols for each of the sidelink synchronization signals (e.g., a number of PSS symbols, a number of SSS symbols and a number of PBCH symbols).

In some cases, the synchronization signal configuration may indicate that no symbols are configured for sidelink synchronization signals, such as illustrated in synchronization signal resources 400-*c* of FIG. 4C, in which no OFDM symbols 405 are configured for sidelink synchronization signals. Such a configuration may be provided, for example, due to a known timing relationship with other transmissions within the network, and a serving base station may provide such a configuration to allow for scheduling of other transmissions. In some cases, the base station may subsequently provide an updated configuration such as illustrated in FIGS. 4A or 4B. Further, in some cases, one or more of the sidelink synchronization signals may not be configured for transmission, such as, in the example of FIG. 4A, where PBCH may not be transmitted due to a timing relationship and/or beam index information being known at each UE that is to participate in the sidelink communications.

Figure 5:
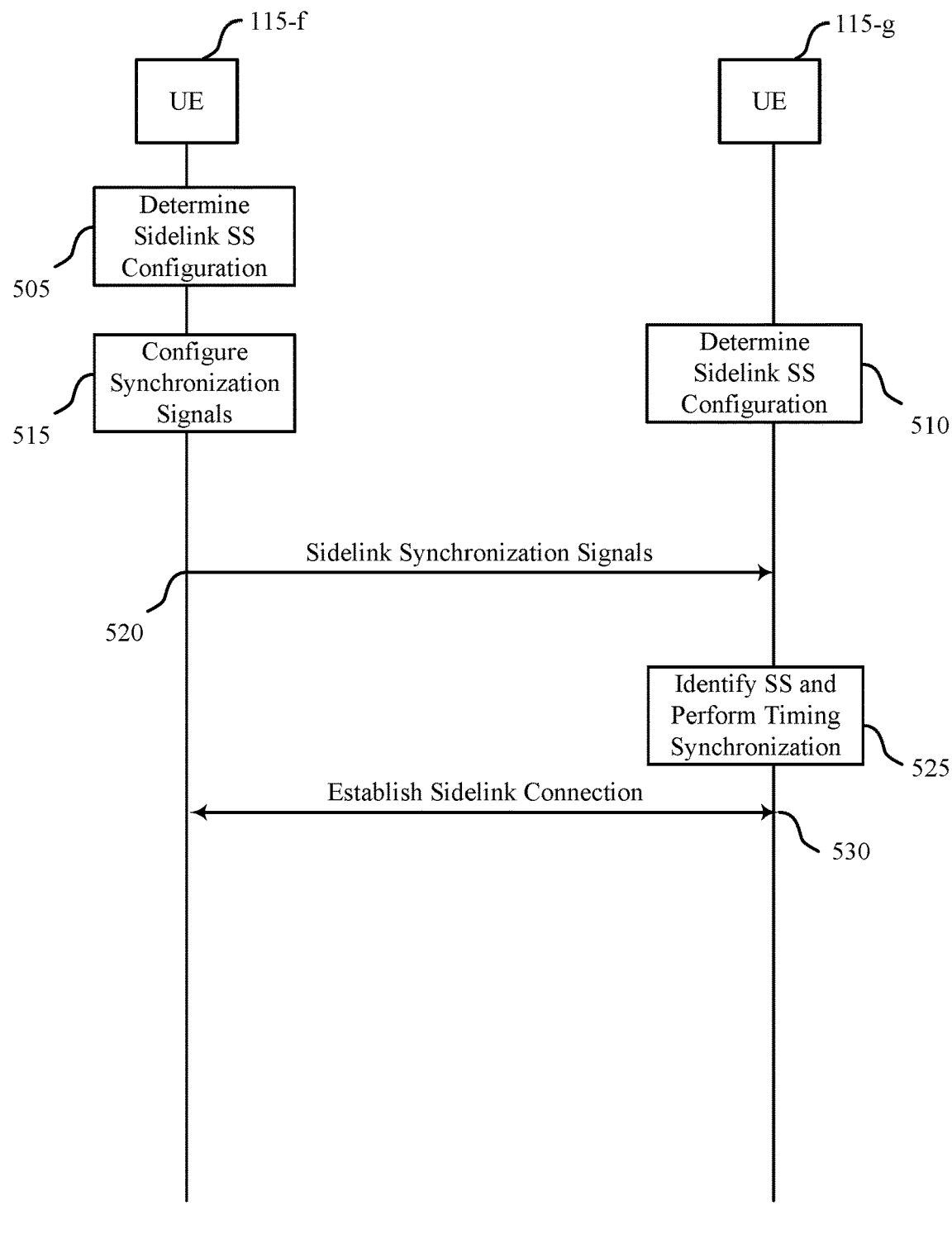
FIGS. 5 and 6 illustrate examples of process flows that support device-to-device synchronization in wireless communications in accordance with aspects of the present disclosure.

FIG. 5 illustrates an example of a process flow 500 that supports device-to-device synchronization in wireless communications in accordance with aspects of the present disclosure. In some examples, process flow 500 may implement aspects of wireless communications system 100, 200, or 300. Process flow 500 may be implemented by a first UE 115-*f* and a second UE 115-*g*, or any other examples of UEs 115 as described herein. Alternative examples of the following may be implemented, where some steps are performed in a different order than described or are not performed at all. In some cases, steps may include additional features not mentioned below, or further steps may be added.

At 505, the first UE 115-*f* may determine a sidelink synchronization signal configuration. In some cases, the first UE 115-*f* may determine the sidelink synchronization signal configuration based on a configuration provided by a serving base station. At 510, the second UE 115-*g* may determine the sidelink synchronization signal configuration. In some cases, the second UE 115-*g* also may determine the sidelink synchronization signal configuration based on a configuration provided by a serving base station. In other cases, the second UE 115-*g* may determine the sidelink synchronization signal configuration based on information provided by the first UE 115-*f* (e.g., based on updated information provided in a prior established sidelink connection with the first UE 115-*f*). In some cases, the sidelink synchronization signal configuration may also include beam information related to one or more particular beams that may be used for transmission of the sidelink synchronization signals (e.g., based on a configured beam index, raster scan associated with the sidelink synchronization signals, specific time window for device discovery and measurement, or the like).

At 515, the first UE 115-*f* may configure sidelink synchronization signals for transmission. In some cases, the sidelink synchronization signals may include one or more of a first sidelink synchronization signal that provides coarse synchronization for the second UE 115-*g* or a second sidelink synchronization signal that provides an identifier of the first UE 115-*f* (e.g., a physical or virtual cell ID, or sidelink ID, that is indicated by a sequence of the second sidelink synchronization signal). The first UE 115-*f* may, at 520, transmit the sidelink synchronization signals.

At 525, the second UE 115-*g* may identify the sidelink synchronization signals and perform timing synchronization. In some cases, the second UE 115-*g* may identify a search space for a first sidelink synchronization signal (e.g., an SRS or PSS having a predetermined sequence) and attempt to decode the first sidelink synchronization signal based on multiple hypotheses for a location and a particular sequence of the first sidelink synchronization signal. The first sidelink synchronization signal may provide a coarse timing (e.g., frame level synchronization) for communications of the first UE 115-*f* Based on a successful decoding of the first sidelink synchronization signal, the second UE 115-*g* may identify a search space and one or more sequences that may be used to transmit the second sidelink synchronization signal, and the second UE 115-*d* may attempt to decode the second sidelink synchronization signal using multiple hypotheses associated with the determined search space and sequences. Upon detecting the second sidelink synchronization signal, the second UE 115-*g* may determine fine timing (e.g., symbol level synchronization) for communications of the first UE 115-*f* Further, based on a sequence used for the second sidelink synchronization signal, the second UE 115-*g* may identify a cell ID of the first UE 115-*f* that is to be used for sidelink communications with the first UE 115-*f*

At 530, the first UE 115-*f* and the second UE 115-*g* may establish a sidelink connection. In some cases, the second UE 115-*g* may determine resources (e.g., random access resources associated with one or more of the first or second sidelink synchronization signals, or resources indicated in system information (e.g., in PBCH) provided by the first UE 115-*f*) for transmission of a connection request to the first UE 115-*f* The second UE 115-*g* may transmit the connection request using the determined resources, which may be received at the first UE 115-*f*, and the first UE 115-*f* and the second UE 115-*g* may exchange messages (e.g., RACH procedure messages and connection establishment messages) to establish the sidelink connection.

Figure 6:
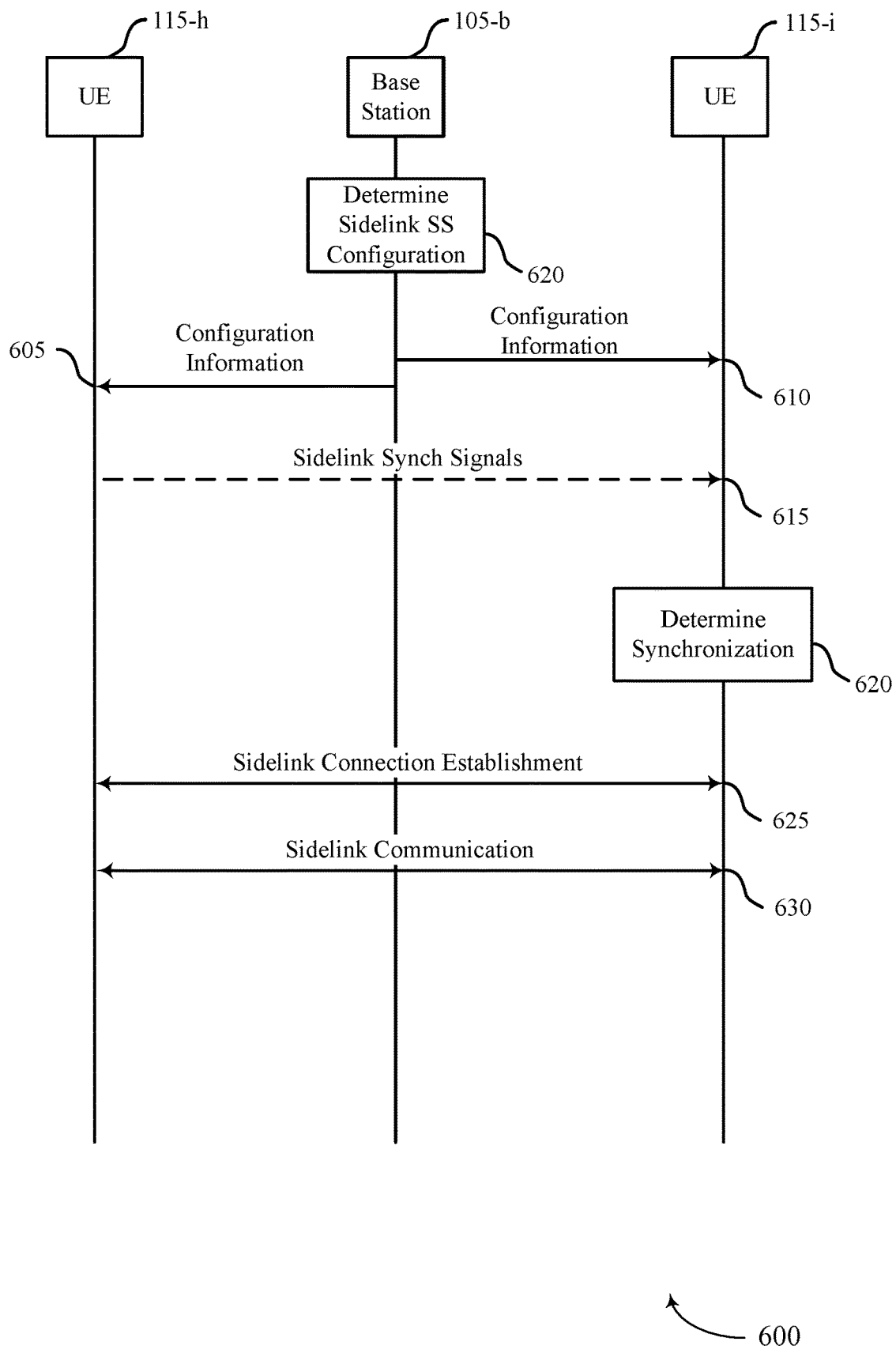

FIG. 6 illustrates an example of a process flow 600 that supports device-to-device synchronization in wireless communications in accordance with aspects of the present disclosure. In some examples, process flow 600 may implement aspects of wireless communications system 100, 200, or 300. Process flow 600 may be implemented by a base station 105-*b*, a first UE 115-*h* and a second UE 115-*i*, or any other examples of base stations 105 and UEs 115 as described herein. Alternative examples of the following may be implemented, where some steps are performed in a different order than described or are not performed at all. In some cases, steps may include additional features not mentioned below, or further steps may be added.

At 605, the base station 105-*b* may determine a sidelink synchronization signal configuration. In some cases, the base station 105-*b* may determine the sidelink synchronization signal based on channel conditions at the first UE 115-*h* (e.g., a frequency range to be used for the sidelink communications, mobility of the first UE 115-*h*, scheduling information for other devices served by the base station 105-*b*). In some cases, the base station 105-*b* may identify a sidelink synchronization signal sequence (e.g., a PSS sequence or a first SRS sequence) that is to be used for a first sidelink synchronization signal, and a set of sidelink synchronization signal sequences to be used for a second sidelink synchronization signal (e.g., an SSS or a second SRS sequence). In some cases, the base station 105-*b* may identify one or more beams that are to be used for sidelink communications, and the sidelink synchronization signals may be determined based on the one or more identified beams (e.g., a PSS/SSS or SRSs that are associated with the one or more identified beams).

At 610, the base station 105-*b* may transmit configuration information to the first UE 115-*h*. Likewise, at 615, the base station may transmit configuration information to the second UE 115-*i*. In some cases, the base station 105-*b* may transmit the configuration to each of the UEs 115 in control signaling on an access link that is established between the base station 105-*b* and each UE 115.

At 615, the first UE 115-*h* may transmit the sidelink synchronization signals, which may be received at the second UE 115-*i*. In some cases, the sidelink synchronization signals may include one or more of a first sidelink synchronization signal that provides coarse synchronization for the second UE 115-*i* or a second sidelink synchronization signal that provides an identifier of the first UE 115-*h* (e.g., a physical or virtual cell ID, or sidelink ID, that is indicated by a sequence of the second sidelink synchronization signal).

At 620, the second UE 115-*i* may identify the sidelink synchronization signals and determine timing synchronization. In some cases, the second UE 115-*i* may identify a search space for a first sidelink synchronization signal (e.g., an SRS or PSS having a predetermined sequence) and attempt to decode the first sidelink synchronization signal according based on multiple hypotheses for a location and particular sequence of the first sidelink synchronization signal. The first sidelink synchronization signal may provide a coarse timing for communications of the first UE 115-*h*. Based on a successful decoding of the first sidelink synchronization signal, the second UE 115-*i* may identify a search space and one or more sequences that may be used to transmit the second sidelink synchronization signal, and the second UE 115-*d* may attempt to decode the second sidelink synchronization signal using multiple hypotheses associated with the determined search space and sequences. Upon detecting the second sidelink synchronization signal, the second UE 115-*i* may determine fine timing for communications of the first UE 115-*h*. Further, based on a sequence used for the second sidelink synchronization signal, the second UE 115-*i* may identify a cell ID of the first UE 115-*h* that is to be used for sidelink communications with the first UE 115-*h*.

At 625, the first UE 115-*h* and the second UE 115-*i* may perform a sidelink connection establishment. In some cases, the second UE 115-*i* may determine resources (e.g., random access resources associated with one or more of the first or second sidelink synchronization signals, or resources indicated in system information (e.g., in PBCH) provided by the first UE 115-*h*) for transmission of a connection request to the first UE 115-*h*. The second UE 115-*i* may transmit the connection request using the determined resources, which may be received at the first UE 115-*h*, and the first UE 115-*h* and the second UE 115-*i* may exchange messages (e.g., RACH procedure messages and connection establishment messages) to establish the sidelink connection. At 630, the first UE 115-*h* and the second UE 115-*i* may communicate via the established sidelink connection.

Figure 7:
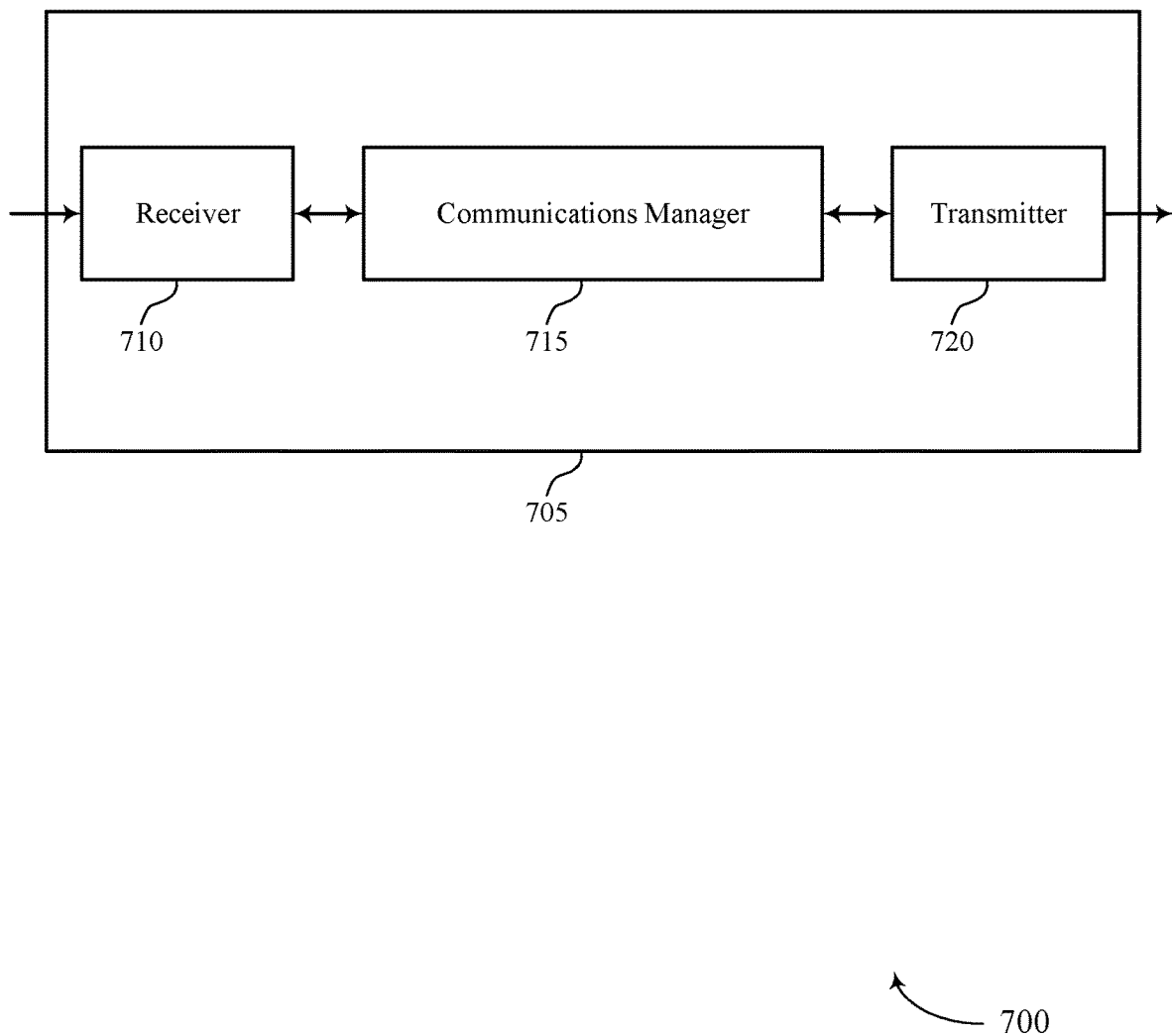
FIGS. 7 and 8 show block diagrams of devices that support device-to-device synchronization in wireless communications in accordance with aspects of the present disclosure.

FIG. 7 shows a block diagram 700 of a device 705 that supports device-to-device synchronization in wireless communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to device-to-device synchronization in wireless communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715, when the device 705 is acting as a first UE, may identify a set of sidelink synchronization signals for transmission to at least a second UE for synchronizing a sidelink communications link between the first UE and at least the second UE, the set of sidelink synchronization signals including one or more of a first sidelink synchronization signal that provides coarse synchronization or a second sidelink synchronization signal that provides fine synchronization and an identifier of the first UE, transmit the set of sidelink synchronization signals based on the identifying, receive, from the second UE, a sidelink connection request based on the transmitted set of sidelink synchronization signals, and establish the sidelink communications link with the second UE responsive to the sidelink connection request.

The communications manager 715 may also, when the device 705 is acting as a second UE, identify a set of resources to monitor for sidelink synchronization signals for synchronizing a sidelink communications link between a first UE and the second UE, the sidelink synchronization signals including one or more of a first sidelink synchronization signal that provides coarse synchronization or a second sidelink synchronization signal that provides fine synchronization and an identifier of the first UE, receive the first sidelink synchronization signal from the first UE on the set of resources, determine, based on the first sidelink synchronization signal, a coarse timing for the second sidelink synchronization signal, receive, based on the coarse timing, the second sidelink synchronization signal, determine, based on the second sidelink synchronization signal, a fine timing for synchronizing communications with the first UE and the identifier of the first UE, and transmit, to the first UE, a sidelink connection request based on the fine timing and the identifier of the first UE. The communications manager 715 may be an example of aspects of the communications manager 1010 described herein. The actions performed by the communications manager 715 as described herein may be implemented to realize one or more potential advantages. One implementation may allow a UE 115 to save power and increase battery life by efficiently determining synchronization of sidelink communications. Additionally or alternatively, the UE 115 may further reduce complexity by implementing signals or signal formats that are used for communications between base stations and UEs. Another implementation may provide improved quality and reliability of service at the UE 115, as latency and the number of separate resources allocated to the UE 115 may be reduced.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
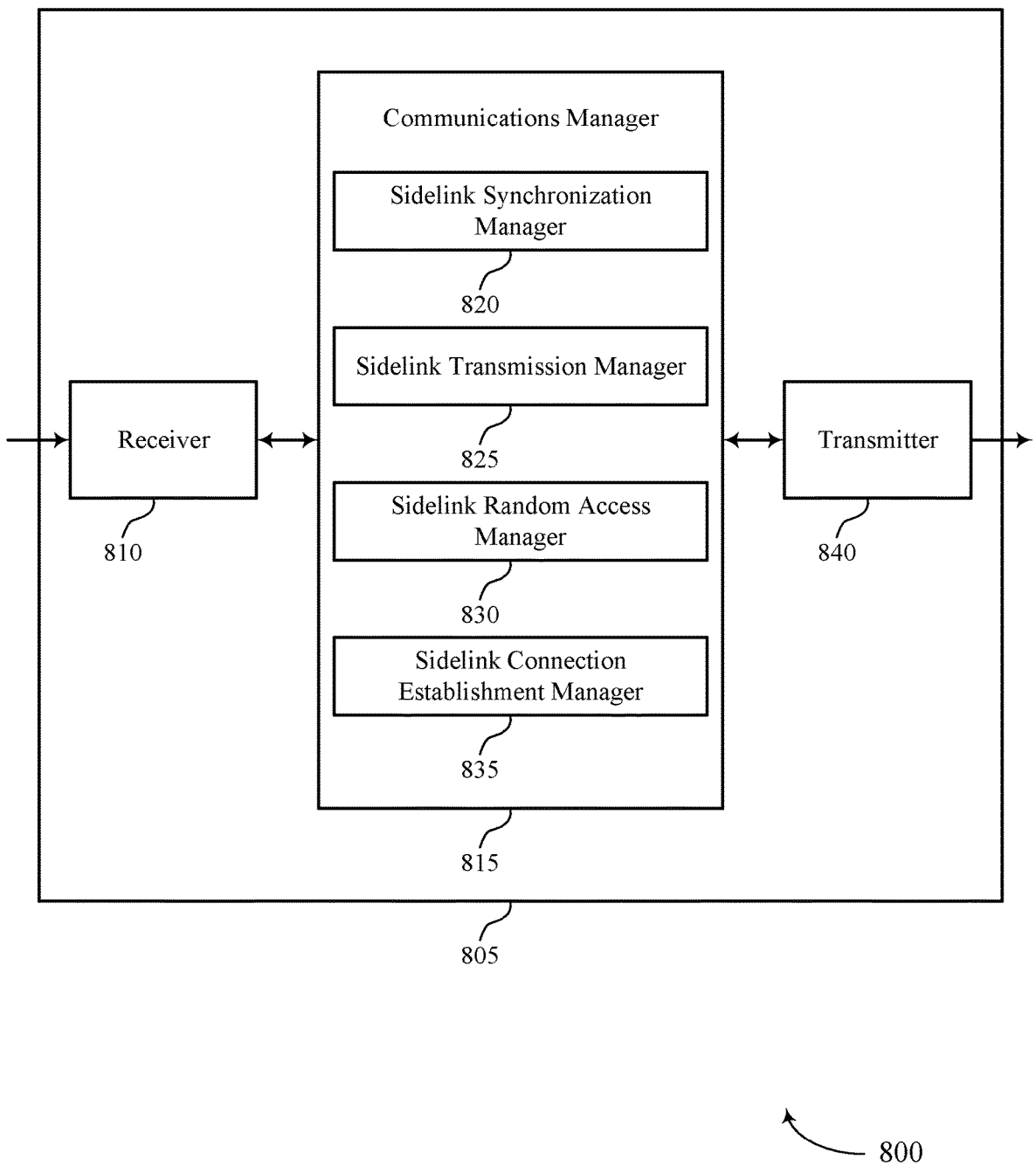

FIG. 8 shows a block diagram 800 of a device 805 that supports device-to-device synchronization in wireless communications in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to device-to-device synchronization in wireless communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a sidelink synchronization manager 820, a sidelink transmission manager 825, a sidelink random access manager 830, and a sidelink connection establishment manager 835. The communications manager 815 may be an example of aspects of the communications manager 1010 described herein.

The sidelink synchronization manager 820, when the communications manager 815 is at a first UE that transmits sidelink synchronization signals, may identify a set of sidelink synchronization signals for transmission to at least a second UE for synchronizing a sidelink communications link between the first UE and at least the second UE, the set of sidelink synchronization signals including one or more of a first sidelink synchronization signal that provides coarse synchronization or a second sidelink synchronization signal that provides fine synchronization and an identifier of the first UE. The sidelink transmission manager 825 may transmit the set of sidelink synchronization signals based on the identifying. The sidelink random access manager 830 may receive, from the second UE, a sidelink connection request based on the transmitted set of sidelink synchronization signals. The sidelink connection establishment manager 835 may establish the sidelink communications link with the second UE responsive to the sidelink connection request.

The sidelink synchronization manager 820, when the communications manager 815 is at a second UE that monitors for sidelink synchronization signals, may identify a set of resources to monitor for sidelink synchronization signals for synchronizing a sidelink communications link between a first UE and the second UE, the sidelink synchronization signals including one or more of a first sidelink synchronization signal that provides coarse synchronization or a second sidelink synchronization signal that provides fine synchronization and an identifier of the first UE, receive the first sidelink synchronization signal from the first UE on the set of resources, determine, based on the first sidelink synchronization signal, a coarse timing for the second sidelink synchronization signal, receive, based on the coarse timing, the second sidelink synchronization signal, and determine, based on the second sidelink synchronization signal, a fine timing for synchronizing communications with the first UE and the identifier of the first UE. The sidelink random access manager 830 may transmit, to the first UE, a sidelink connection request based on the fine timing and the identifier of the first UE. Based on monitoring for sidelink synchronization signals, a processor of a UE 115 (e.g., controlling the receiver 810, the transmitter 840, or the transceiver 1020 as described with reference to FIG. 10) may efficiently determine timing for synchronization signals. Further, the processor of UE 115 may transmit a sidelink connection request. The processor of the UE 115 may turn on one or more processing units for establishing sidelink communications, increase a processing clock, or a similar mechanism within the UE 115. As such, when the sidelink communications are established, the processor may be ready to respond more efficiently through the reduction of a ramp up in processing power.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
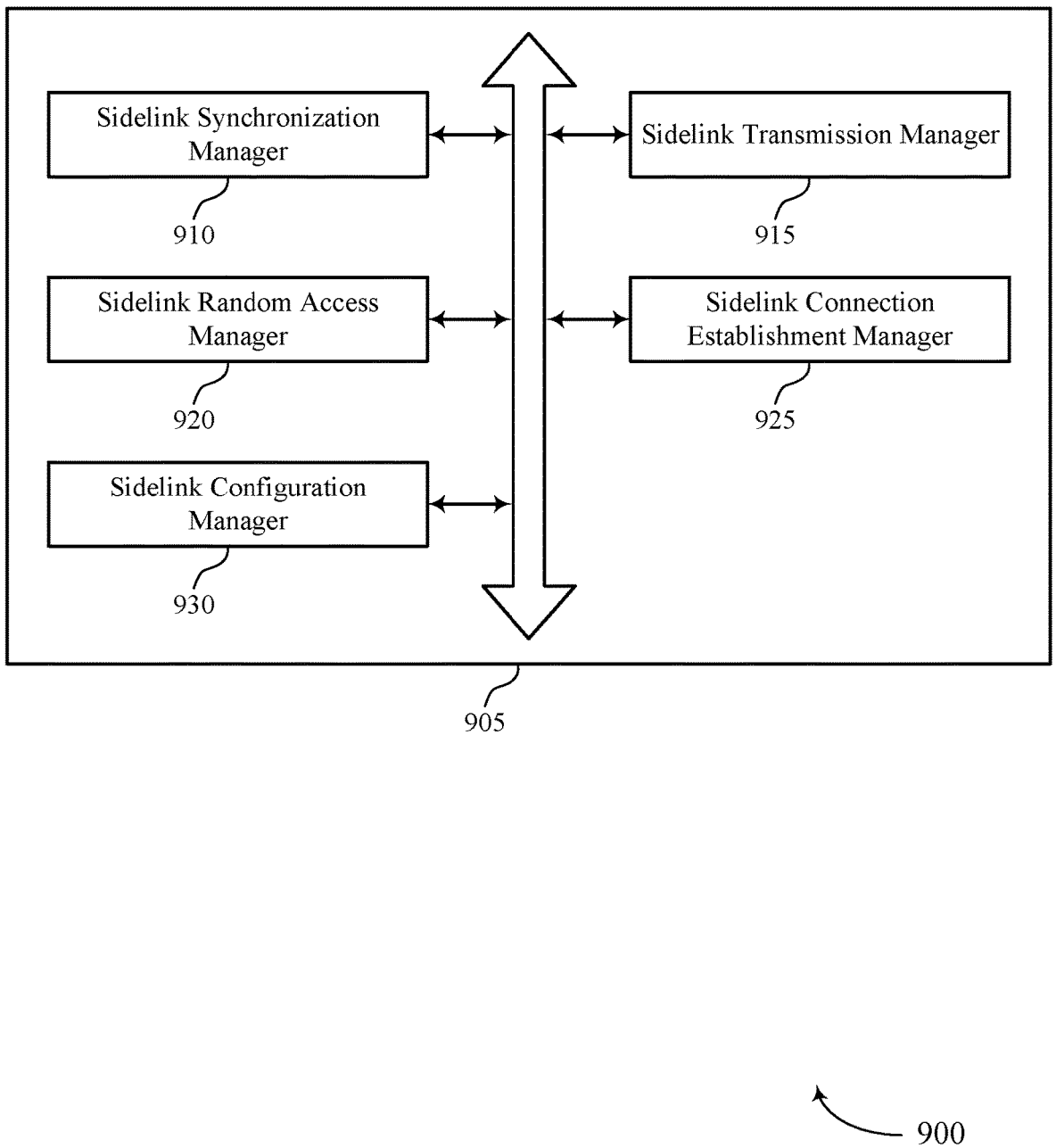
FIG. 9 shows a block diagram of a communications manager that supports device-to-device synchronization in wireless communications in accordance with aspects of the present disclosure.

FIG. 9 shows a block diagram 900 of a communications manager 905 that supports device-to-device synchronization in wireless communications in accordance with aspects of the present disclosure. The communications manager 905 may be an example of aspects of a communications manager 715, a communications manager 815, or a communications manager 1010 described herein. The communications manager 905 may include a sidelink synchronization manager 910, a sidelink transmission manager 915, a sidelink random access manager 920, a sidelink connection establishment manager 925, and a sidelink configuration manager 930.

Each of these modules may communicate, directly or indirectly, with one another (e.g., via one or more buses).

The sidelink synchronization manager 910, when the communications manager 905 is at a first UE that transmits sidelink synchronization signals, may identify a set of sidelink synchronization signals for transmission to at least a second UE for synchronizing a sidelink communications link between the first UE and at least the second UE, the set of sidelink synchronization signals including one or more of a first sidelink synchronization signal that provides coarse synchronization or a second sidelink synchronization signal that provides fine synchronization and an identifier of the first UE.

In some examples, when the communications manager 905 is at a second UE that receives sidelink synchronization signals, the sidelink synchronization manager 910 may identify a set of resources to monitor for sidelink synchronization signals for synchronizing a sidelink communications link between a first UE and the second UE, the sidelink synchronization signals including one or more of a first sidelink synchronization signal that provides coarse synchronization or a second sidelink synchronization signal that provides fine synchronization and an identifier of the first UE. In some examples, the sidelink synchronization manager 910 may receive the first sidelink synchronization signal from the first UE on the set of resources. In some examples, the sidelink synchronization manager 910 may determine, based on the first sidelink synchronization signal, a coarse timing for the second sidelink synchronization signal. In some examples, the sidelink synchronization manager 910 may receive, based on the coarse timing, the second sidelink synchronization signal. In some examples, the sidelink synchronization manager 910 may determine, based on the second sidelink synchronization signal, a fine timing for synchronizing communications with the first UE and the identifier of the first UE.

In some examples, the sidelink synchronization manager 910 may receive beam index information from a serving base station that indicates a subset of a set of transmission beams that are available for transmissions of the sidelink communications link, and where the set of sidelink synchronization signals are associated with predefined synchronization signals of the subset of transmission beams. In some examples, the sidelink synchronization manager 910 may determine that an updated set of sidelink synchronization signals are to be transmitted based on one or more updated QCL parameters of the first UE. In some examples, the sidelink synchronization manager 910 may transmit an indication of the updated set of sidelink synchronization signals to at least one of the second UE or a base station.

In some examples, the sidelink synchronization manager 910 may determine, at the first UE, a mobility state of the first UE, where the set of synchronization signals is based on the mobility state. In some examples, the sidelink synchronization manager 910 may transmit an indication of the mobility state to one or more of the second UE or a base station.

In some examples, when the communications manager 905 is at a second UE that receives sidelink synchronization signals, the sidelink synchronization manager 910 may receive, from the first UE or a base station, an indication that an updated set of sidelink synchronization signals are to be transmitted based on one or more updated QCL parameters of the first UE. In some examples, the sidelink synchronization manager 910 may receive, from the first UE or a base station, an indication of a mobility state of the first UE. In some examples, the sidelink synchronization manager 910 may determine the set of resources to monitor for sidelink synchronization signals based on the mobility state. In some examples, the sidelink synchronization manager 910 may update the set of resources based on the updated set of sidelink synchronization signals.

In some cases, the set of sidelink synchronization signals further include a physical broadcast channel transmission that provides system information for the sidelink communications link, such as one or more of random access resources to be used by the second UE for transmission of the sidelink connection request, or beam information for the sidelink communications link.

In some cases, the first sidelink synchronization signal is a first sounding reference signal having a first reference signal sequence that provides the coarse synchronization, and the second sidelink synchronization signal is a second reference signal having a second reference signal sequence that is selected from a set of available sounding reference signal sequences to provide the identifier of the first UE and to provide the fine synchronization. In some cases, the first sidelink synchronization signal is a primary synchronization signal and the second sidelink synchronization signal is a secondary synchronization signal.

In some cases, the first sidelink synchronization signal is a first sounding reference signal having a first reference signal sequence that provides the coarse synchronization, and the second sidelink synchronization signal is a second reference signal having a second reference signal sequence that is selected from a set of available sounding reference signal sequences to provide the identifier of the first UE and to provide the fine synchronization. In some cases, the first sidelink synchronization signal is a primary synchronization signal and the second sidelink synchronization signal is a secondary synchronization signal.

The sidelink transmission manager 915, when the communications manager 905 is at a first UE that transmits sidelink synchronization signals, may transmit the set of sidelink synchronization signals based on the identifying. The sidelink random access manager 920 may receive, from the second UE, a sidelink connection request based on the transmitted set of sidelink synchronization signals.

In some examples, the sidelink random access manager 920, when the communications manager 905 is at a second UE that receives sidelink synchronization signals, may transmit, to the first UE, a sidelink connection request based on the fine timing and the identifier of the first UE.

The sidelink connection establishment manager 925 may establish the sidelink communications link responsive to the sidelink connection request.

The sidelink configuration manager 930 may receive, from a serving base station, configuration information that indicates the set of sidelink synchronization signals. In some examples, the sidelink configuration manager 930 may physical resources to be used at the first UE for transmission of the set of sidelink synchronization signals are provided in a signal structure configured by a serving base station, and where the first sidelink synchronization signal and the second sidelink synchronization signal are determined based on the indicated physical resources. In some examples, the sidelink configuration manager 930 may receive updated beam index information. In some examples, the sidelink configuration manager 930 may update the set of sidelink synchronization signals based on the updated beam index information. In some examples, the sidelink configuration manager 930 may receive, from a serving base station, an indication of a time window for device discovery and measurement, and where the set of sidelink synchronization signals is determined based on the time window.

In some examples, the sidelink configuration manager 930 may identify physical resources to be used at the first UE for transmission of the set of sidelink synchronization signals that are provided in a signal structure configured by a serving base station, and where the set of resources is determined based on the indicated physical resources. In some examples, the sidelink configuration manager 930 may receive beam index information from a serving base station that indicates a subset of a set of transmission beams that are available for transmissions of the sidelink communications link, and where the sidelink synchronization signals are associated with predefined synchronization signals of the subset of transmission beams. In some examples, the sidelink configuration manager 930 may receive updated beam index information. In some examples, the sidelink configuration manager 930 may update the set of sidelink synchronization signals based on the updated beam index information. In some examples, the sidelink configuration manager 930 may receive, from a serving base station, an indication of a time window for device discovery and measurement, and where the set of resources is determined based on the time window.

In some cases, the first reference signal sequence is selected from a first subset of available reference signal sequences that provide the coarse synchronization, and the second reference signal sequence is selected from a second subset of available reference signal sequences, and where the first reference signal sequence is associated with a range of cell identifications configured for sidelink communications, and the second reference signal sequence is associated with a specific cell identification within the range of cell identifications. In some cases, the primary synchronization signal is associated with a range of cell identifications configured for sidelink communications, and the secondary synchronization signal is associated with a specific cell identification within the range of cell identifications. In some cases, the physical resources indicated in the configuration information include an indication of symbols for transmission of the first sidelink synchronization signal, the second sidelink synchronization signal, and physical broadcast channel information.

In some cases, the beam index information is provided in a bit mask that indicates the subset of transmission beams or in a synchronization raster that indicates the subset of transmission beams. In some cases, the beam index information is provided in an indication of random access resources that are available for the sidelink connection request that each have an associated beam. In some cases, the sidelink synchronization signals further include a physical broadcast channel transmission that provides system information for the sidelink communications link, such as one or more of random access resources to be used by the second UE for transmission of the sidelink connection request, or beam information for the sidelink communications link. In some cases, the physical resources indicated in the configuration information include an indication of symbols for transmission of the first sidelink synchronization signal, the second sidelink synchronization signal, and physical broadcast channel information.

Figure 10:
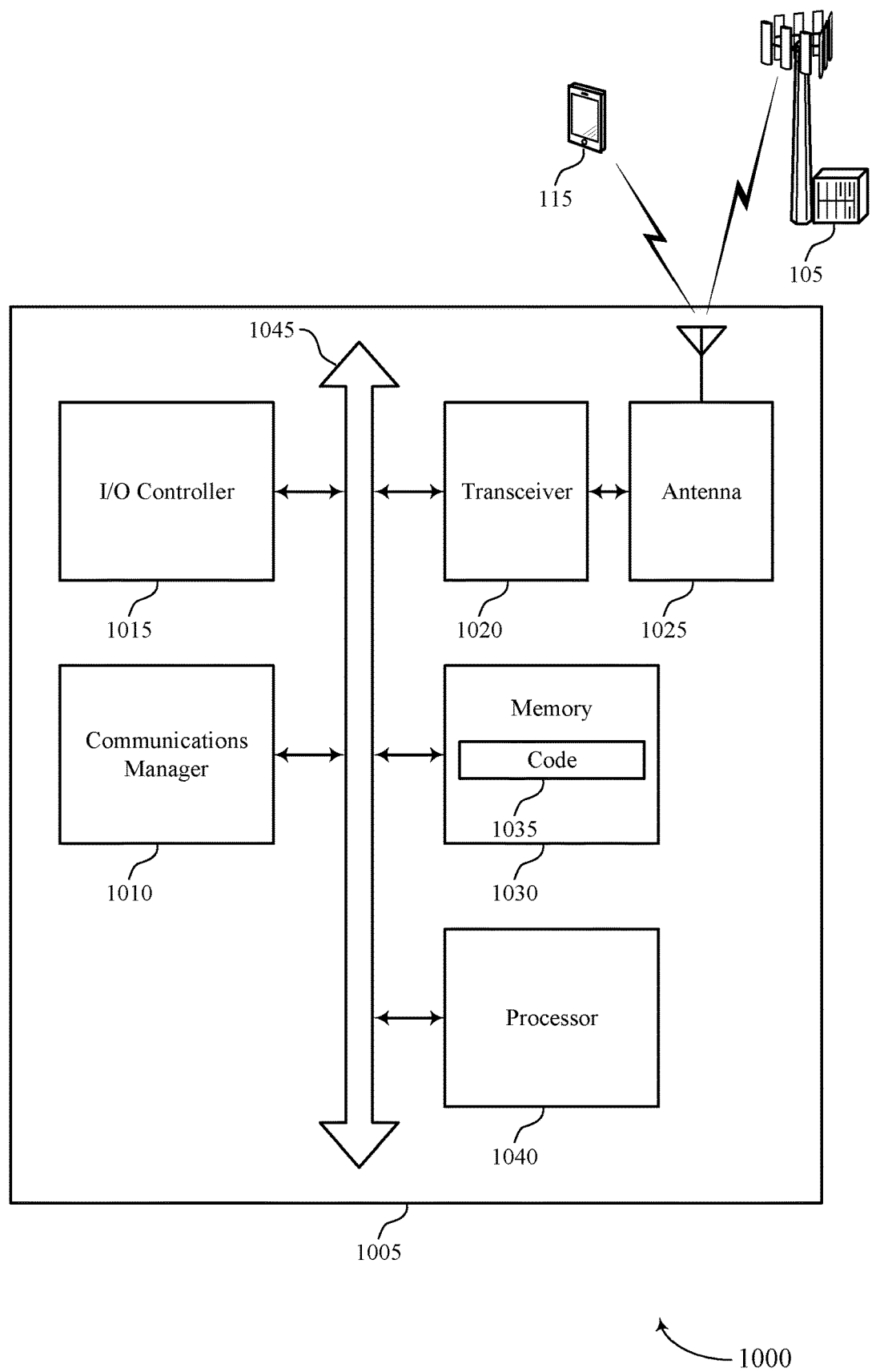
FIG. 10 shows a diagram of a system including a device that supports device-to-device synchronization in wireless communications in accordance with aspects of the present disclosure.

FIG. 10 shows a diagram of a system 1000 including a device 1005 that supports device-to-device synchronization in wireless communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010, when at a first UE that transmits sidelink synchronization signals, may identify a set of sidelink synchronization signals for transmission to at least a second UE for synchronizing a sidelink communications link between the first UE and at least the second UE, the set of sidelink synchronization signals including one or more of a first sidelink synchronization signal that provides coarse synchronization or a second sidelink synchronization signal that provides fine synchronization and an identifier of the first UE, transmit the set of sidelink synchronization signals based on the identifying, receive, from the second UE, a sidelink connection request based on the transmitted set of sidelink synchronization signals, and establish the sidelink communications link with the second UE responsive to the sidelink connection request.

The communications manager 1010, when at a second UE that receives sidelink synchronization signals, may also identify a set of resources to monitor for sidelink synchronization signals for synchronizing a sidelink communications link between a first UE and the second UE, the sidelink synchronization signals including one or more of a first sidelink synchronization signal that provides coarse synchronization or a second sidelink synchronization signal that provides fine synchronization and an identifier of the first UE, receive the first sidelink synchronization signal from the first UE on the set of resources, determine, based on the first sidelink synchronization signal, a coarse timing for the second sidelink synchronization signal, receive, based on the coarse timing, the second sidelink synchronization signal, determine, based on the second sidelink synchronization signal, a fine timing for synchronizing communications with the first UE and the identifier of the first UE, and transmit, to the first UE, a sidelink connection request based on the fine timing and the identifier of the first UE.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases, the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting device-to-device synchronization in wireless communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
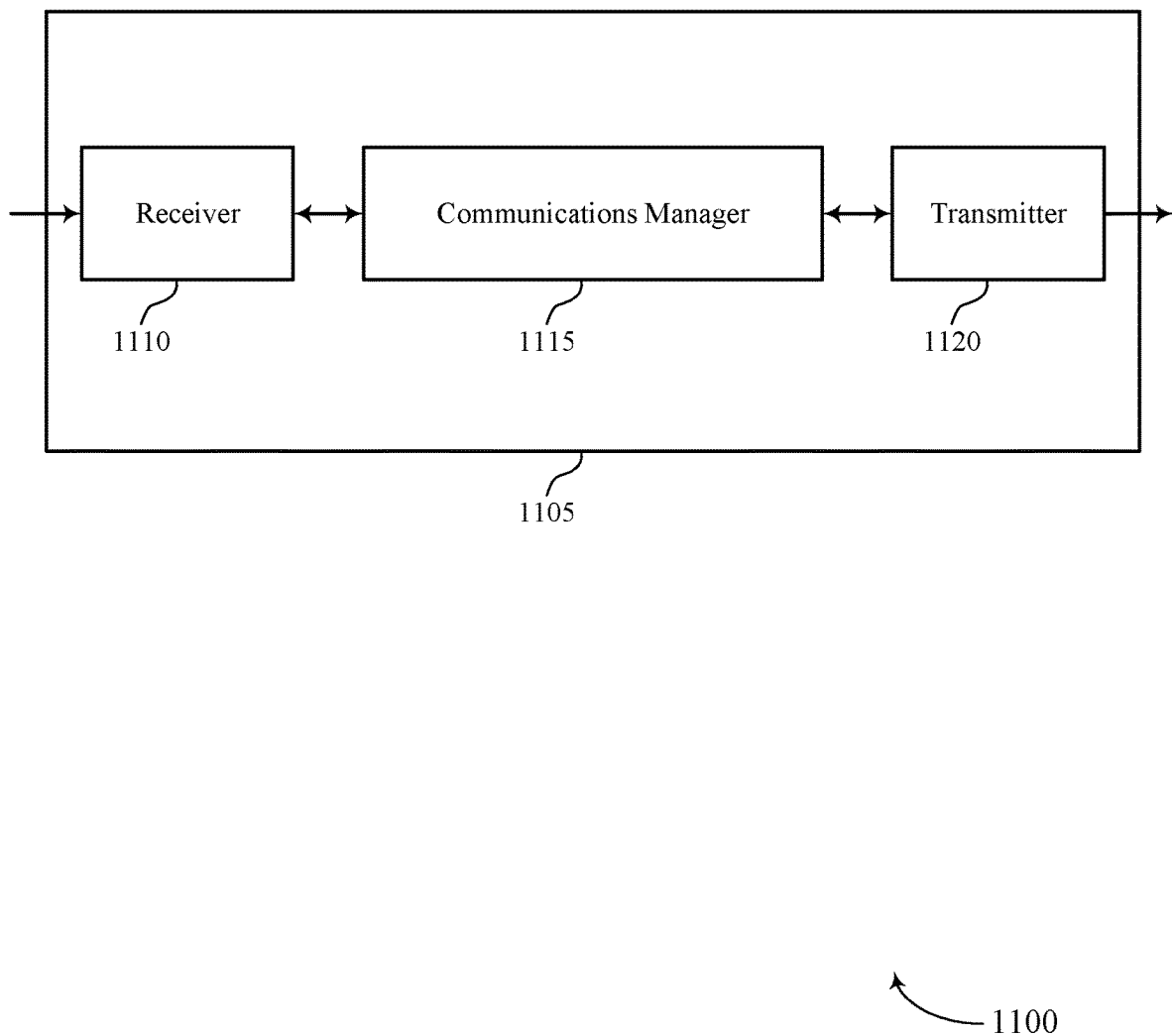
FIGS. 11 and 12 show block diagrams of devices that support device-to-device synchronization in wireless communications in accordance with aspects of the present disclosure.

FIG. 11 shows a block diagram 1100 of a device 1105 that supports device-to-device synchronization in wireless communications in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to device-to-device synchronization in wireless communications, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify at least a first UE that is to provide a sidelink communications link with one or more other UEs, transmit configuration information to at least the first UE that indicates the set of sidelink synchronization signals, and determine, based on one or more channel parameters associated with the first UE, a set of sidelink synchronization signals for synchronizing the sidelink communications link between the first UE and the one or more other UEs, where the set of sidelink synchronization signals include first sidelink synchronization signal that provides coarse synchronization and a second sidelink synchronization signal that provides fine synchronization and an identifier of the first UE. The communications manager 1115 may be an example of aspects of the communications manager 1410 described herein. The actions performed by the communications manager 1115 as described herein may be implemented to realize one or more potential advantages. One implementation may allow a UE 115 in communication with a base station 105 to save power and increase battery life by providing synchronization configuration information so the UE 115 may efficiently determine synchronization of sidelink communications. Additionally or alternatively, the base station may further reduce complexity by providing signals or signal formats that are used for communications between base stations and UEs. Another implementation may provide improved quality and reliability of service at the UE 115, as latency and the number of separate resources allocated to the UE 115 may be reduced.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
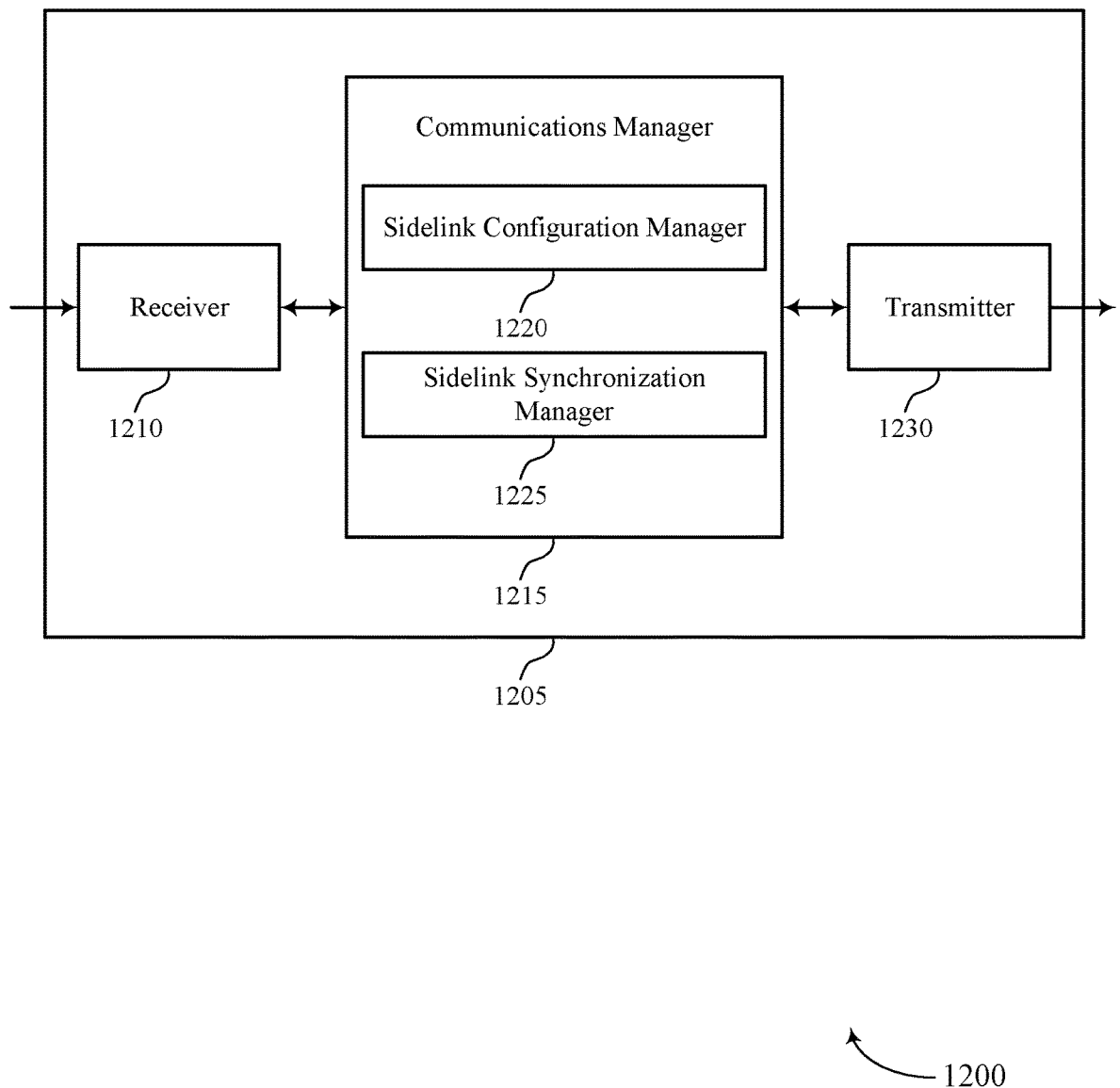

FIG. 12 shows a block diagram 1200 of a device 1205 that supports device-to-device synchronization in wireless communications in accordance with aspects of the present disclosure. The device 1205 may be an example of aspects of a device 1105, or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to device-to-device synchronization in wireless communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a sidelink configuration manager 1220 and a sidelink synchronization manager 1225. The communications manager 1215 may be an example of aspects of the communications manager 1410 described herein.

The sidelink configuration manager 1220 may identify at least a first UE that is to provide a sidelink communications link with one or more other UEs and transmit configuration information to at least the first UE that indicates the set of sidelink synchronization signals.

The sidelink synchronization manager 1225 may determine, based on one or more channel parameters associated with the first UE, a set of sidelink synchronization signals for synchronizing the sidelink communications link between the first UE and the one or more other UEs, where the set of sidelink synchronization signals include first sidelink synchronization signal that provides coarse synchronization and a second sidelink synchronization signal that provides fine synchronization and an identifier of the first UE.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
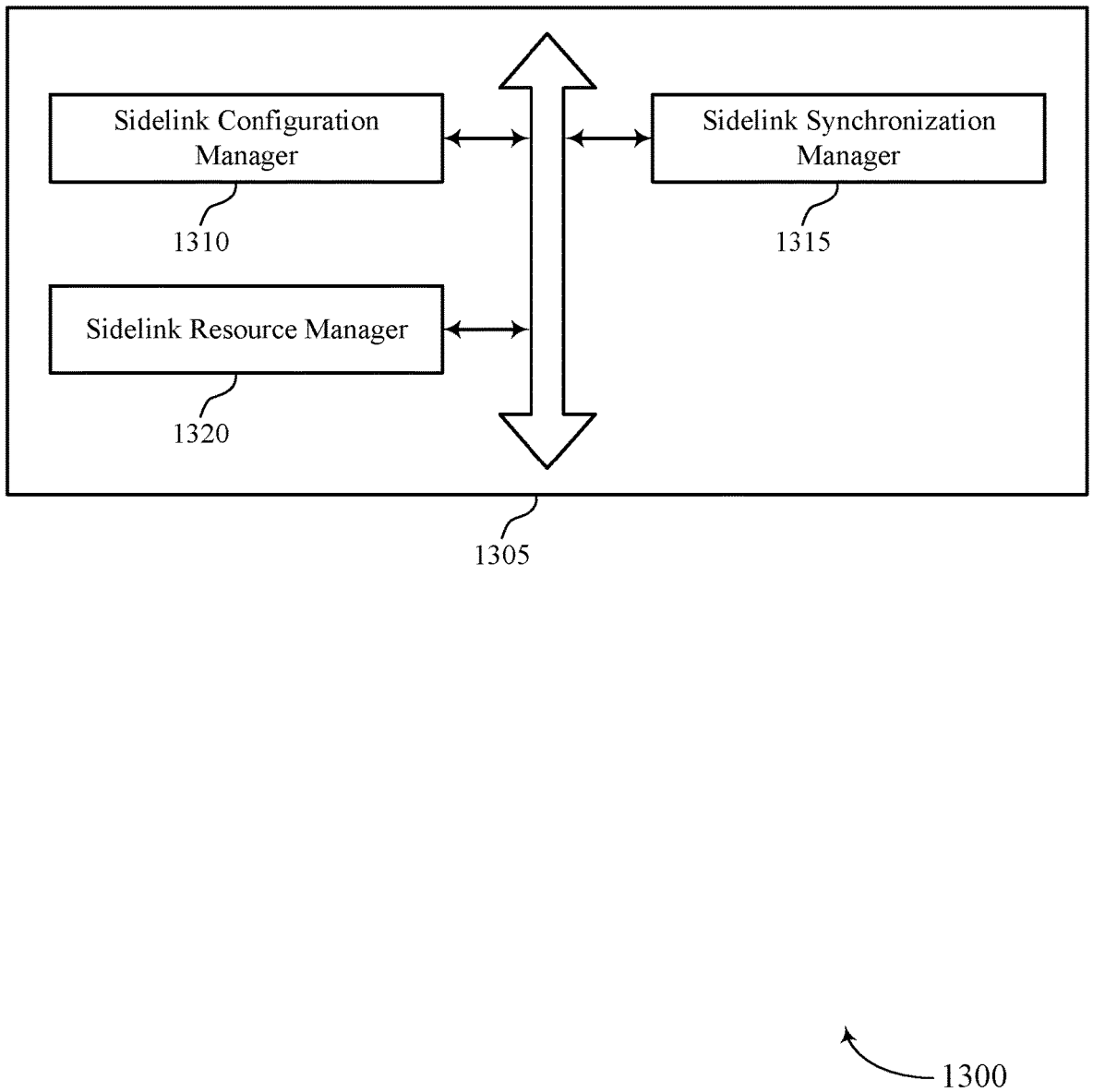
FIG. 13 shows a block diagram of a communications manager that supports device-to-device synchronization in wireless communications in accordance with aspects of the present disclosure.

FIG. 13 shows a block diagram 1300 of a communications manager 1305 that supports device-to-device synchronization in wireless communications in accordance with aspects of the present disclosure. The communications manager 1305 may be an example of aspects of a communications manager 1115, a communications manager 1215, or a communications manager 1410 described herein. The communications manager 1305 may include a sidelink configuration manager 1310, a sidelink synchronization manager 1315, and a sidelink resource manager 1320. Each of these modules may communicate, directly or indirectly, with one another (e.g., via one or more buses).

The sidelink configuration manager 1310 may identify at least a first UE that is to provide a sidelink communications link with one or more other UEs. In some examples, the sidelink configuration manager 1310 may transmit configuration information to at least the first UE that indicates the set of sidelink synchronization signals. In some cases, the set of sidelink synchronization signals further include a physical broadcast channel transmission that provides system information for the sidelink communications link, such as one or more of random access resources to be used by the second UE for transmission of the sidelink connection request, or beam information for the sidelink communications link.

In some cases, the first sidelink synchronization signal is a first sounding reference signal having a first reference signal sequence that provides the coarse synchronization, and the second sidelink synchronization signal is a second reference signal having a second reference signal sequence that is selected from a set of available sounding reference signal sequences to provide the identifier of the first UE and to provide the fine synchronization. In some cases, the first reference signal sequence is selected from a first subset of available reference signal sequences that provide the coarse synchronization, and the second reference signal sequence is selected from a second subset of available reference signal sequences, and where the first reference signal sequence is associated with a range of cell identifications configured for sidelink communications, and the second reference signal sequence is associated with a specific cell identification within the range of cell identifications.

In some cases, the first sidelink synchronization signal is a primary synchronization signal and the second sidelink synchronization signal is a secondary synchronization signal. In some cases, the set of sidelink synchronization signals include one or more of a sounding reference signal, a primary synchronization signal, a secondary synchronization signal, a physical broadcast channel signal, a channel state information reference signal, or a control channel signal.

In some cases, the configuration information provides beam index information that indicates a subset of a set of transmission beams that are available for transmissions of the sidelink communications link, and where the set of sidelink synchronization signals are associated with synchronization signals of the subset of transmission beams. In some cases, the beam index information is provided in a bit mask that indicates the subset of transmission beams or in a synchronization raster that indicates the subset of transmission beams. In some cases, the configuration information provides an indication of a time window for device discovery and measurement, and where the set of sidelink synchronization signals is determined based on the time window. In some cases, the one or more channel parameters include one or more of a mobility state of the first UE, a direction of movement of the first UE, a transmit timing of the base station and the first UE, or a number of UEs that are enabled to establish a sidelink communications link.

The sidelink synchronization manager 1315 may determine, based on one or more channel parameters associated with the first UE, a set of sidelink synchronization signals for synchronizing the sidelink communications link between the first UE and the one or more other UEs, where the set of sidelink synchronization signals include first sidelink synchronization signal that provides coarse synchronization and a second sidelink synchronization signal that provides fine synchronization and an identifier of the first UE.

In some examples, the sidelink synchronization manager 1315 may receive, from the first UE, updated channel information. In some examples, the sidelink synchronization manager 1315 may determine, based on the updated channel information, updated beam index information.

The sidelink resource manager 1320 may identify resources and configurations associated with sidelink communications. In some cases, the primary synchronization signal is associated with a range of cell identifications configured for sidelink communications, and the secondary synchronization signal is associated with a specific cell identification within the range of cell identifications. In some cases, the configuration information provides a signal structure that indicates physical resources to be used at the first UE for transmission of the set of sidelink synchronization signals, and where the set of sidelink synchronization signals are determined based on the indicated physical resources. In some cases, the physical resources indicated in the configuration information include an indication of symbols for transmission of the first sidelink synchronization signal, the second sidelink synchronization signal, and physical broadcast channel information. In some cases, beam index information is provided in an indication of random access resources that are available for sidelink connection requests used to establish the sidelink communications link. In some cases, the random access resources include a set of random access resources that each have an associated beam.

Figure 14:
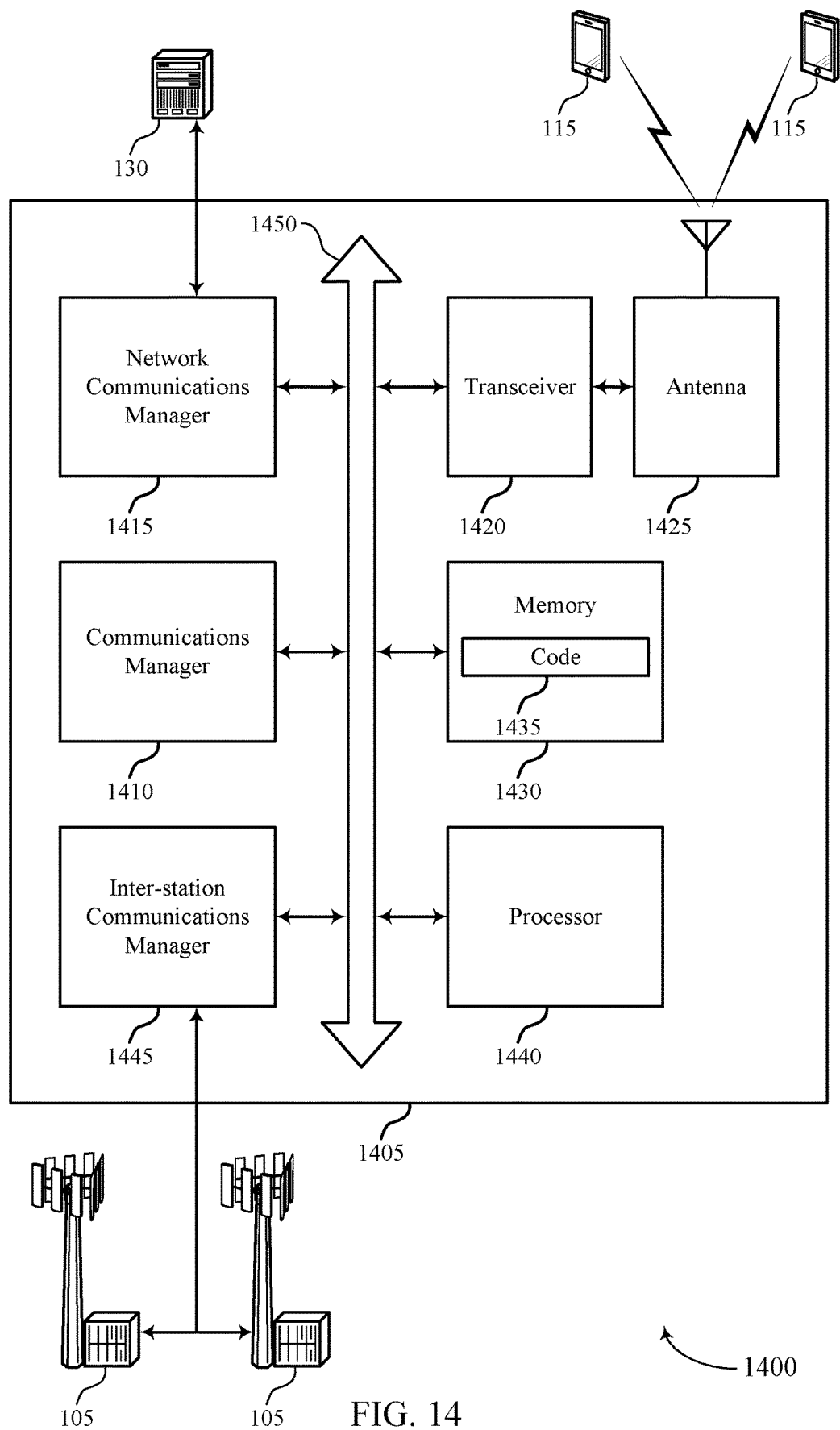
FIG. 14 shows a diagram of a system including a device that supports device-to-device synchronization in wireless communications in accordance with aspects of the present disclosure.

FIG. 14 shows a diagram of a system 1400 including a device 1405 that supports device-to-device synchronization in wireless communications in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may identify at least a first UE that is to provide a sidelink communications link with one or more other UEs, transmit configuration information to at least the first UE that indicates the set of sidelink synchronization signals, and determine, based on one or more channel parameters associated with the first UE, a set of sidelink synchronization signals for synchronizing the sidelink communications link between the first UE and the one or more other UEs, where the set of sidelink synchronization signals include first sidelink synchronization signal that provides coarse synchronization and a second sidelink synchronization signal that provides fine synchronization and an identifier of the first UE.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases, the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting device-to-device synchronization in wireless communications).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
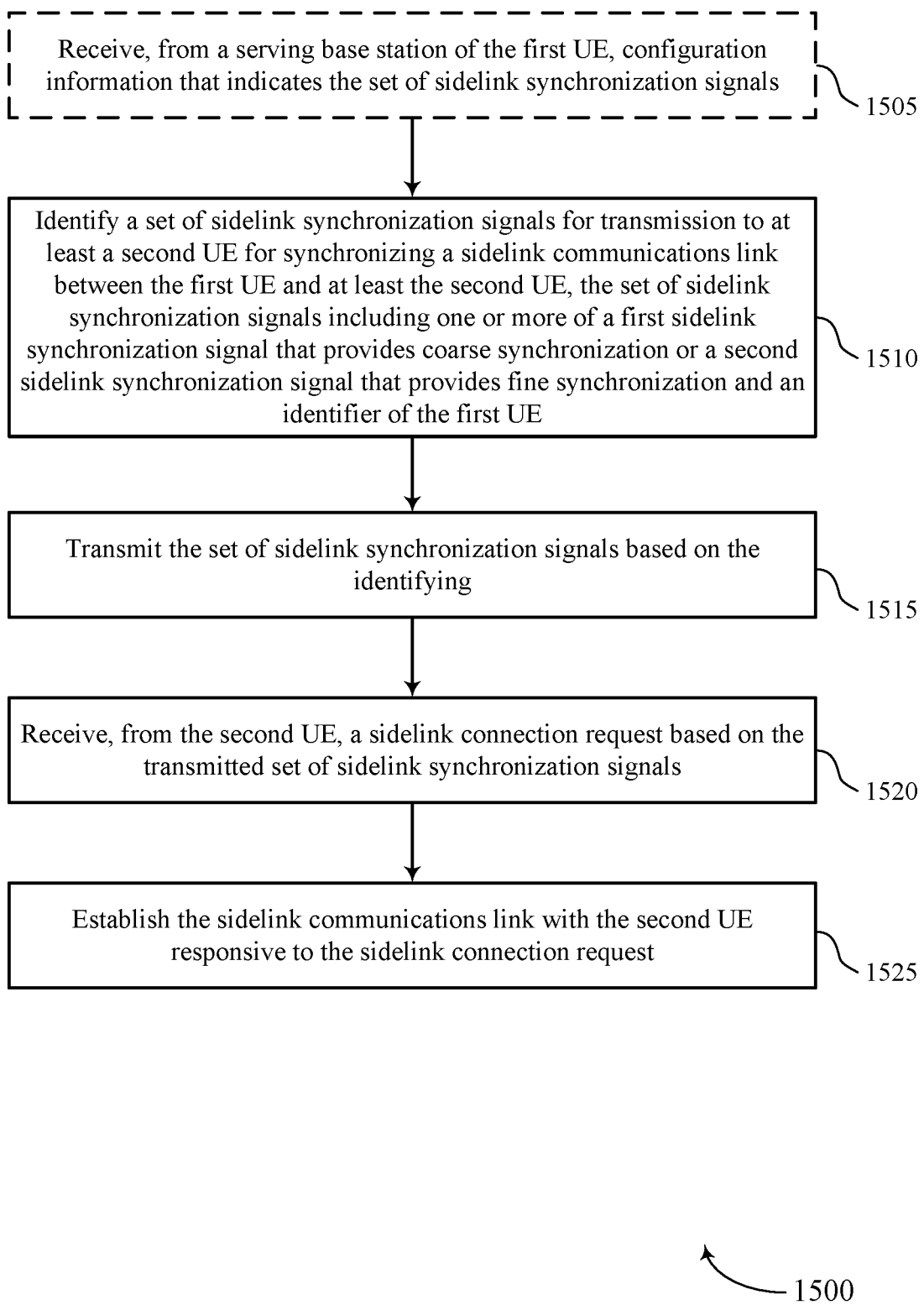
FIGS. 15 through 18 show flowcharts illustrating methods that support device-to-device synchronization in wireless communications in accordance with aspects of the present disclosure.

FIG. 15 shows a flowchart illustrating a method 1500 that supports device-to-device synchronization in wireless communications in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

Optionally, at 1505, the UE may receive, from a serving base station of the first UE, configuration information that indicates the set of sidelink synchronization signals. The operations of 1505 may be performed according to the methods described herein. In some examples, aspects of the operations of 1505 may be performed by a sidelink configuration manager as described with reference to FIGS. 7 through 10.

At 1510, the UE may identify a set of sidelink synchronization signals for transmission to at least a second UE for synchronizing a sidelink communications link between the first UE and at least the second UE, the set of sidelink synchronization signals including one or more of a first sidelink synchronization signal that provides coarse synchronization or a second sidelink synchronization signal that provides fine synchronization and an identifier of the first UE. The operations of 1510 may be performed according to the methods described herein. In some examples, aspects of the operations of 1510 may be performed by a sidelink synchronization manager as described with reference to FIGS. 7 through 10. In some cases, the set of sidelink synchronization signals may also include a physical broadcast channel transmission that provides system information for the sidelink communications link, such as one or more of random access resources to be used by the second UE for transmission of the sidelink connection request, beam information for the sidelink communications link, and the like.

In some cases, the first sidelink synchronization signal is a first sounding reference signal having a first reference signal sequence that provides the coarse synchronization, and the second sidelink synchronization signal is a second reference signal having a second reference signal sequence that is selected from a set of available sounding reference signal sequences to provide the identifier of the first UE and to provide the fine synchronization. In some cases, the first reference signal sequence is selected from a first subset of available reference signal sequences that provide the coarse synchronization, and the second reference signal sequence is selected from a second subset of available reference signal sequences, and where the first reference signal sequence is associated with a range of cell identifications configured for sidelink communications, and the second reference signal sequence is associated with a specific cell identification within the range of cell identifications.

In some cases, the first sidelink synchronization signal is a primary synchronization signal and the second sidelink synchronization signal is a secondary synchronization signal. In some cases, the primary synchronization signal is associated with a range of cell identifications configured for sidelink communications, and the secondary synchronization signal is associated with a specific cell identification within the range of cell identifications.

In some cases, physical resources to be used at the first UE for transmission of the set of sidelink synchronization signals may be provided in a signal structure configured by a serving base station, and where the first sidelink synchronization signal and the second sidelink synchronization signal are determined based on the indicated physical resources. In some cases, the physical resources indicated in the configuration information include an indication of symbols for transmission of the first sidelink synchronization signal, the second sidelink synchronization signal, and physical broadcast channel information. In some cases, the UE may receive, from a serving base station, an indication of a time window for device discovery and measurement, and where the set of sidelink synchronization signals is determined based on the time window.

At 1520, the UE may transmit the set of sidelink synchronization signals based on the identifying. The operations of 1520 may be performed according to the methods described herein. In some examples, aspects of the operations of 1520 may be performed by a sidelink transmission manager as described with reference to FIGS. 7 through 10.

At 1525, the UE may receive, from the second UE, a sidelink connection request based on the transmitted set of sidelink synchronization signals. The operations of 1525 may be performed according to the methods described herein. In some examples, aspects of the operations of 1525 may be performed by a sidelink random access manager as described with reference to FIGS. 7 through 10.

At 1530, the UE may establish the sidelink communications link with the second UE responsive to the sidelink connection request. The operations of 1530 may be performed according to the methods described herein. In some examples, aspects of the operations of 1530 may be performed by a sidelink connection establishment manager as described with reference to FIGS. 7 through 10.

Figure 16:
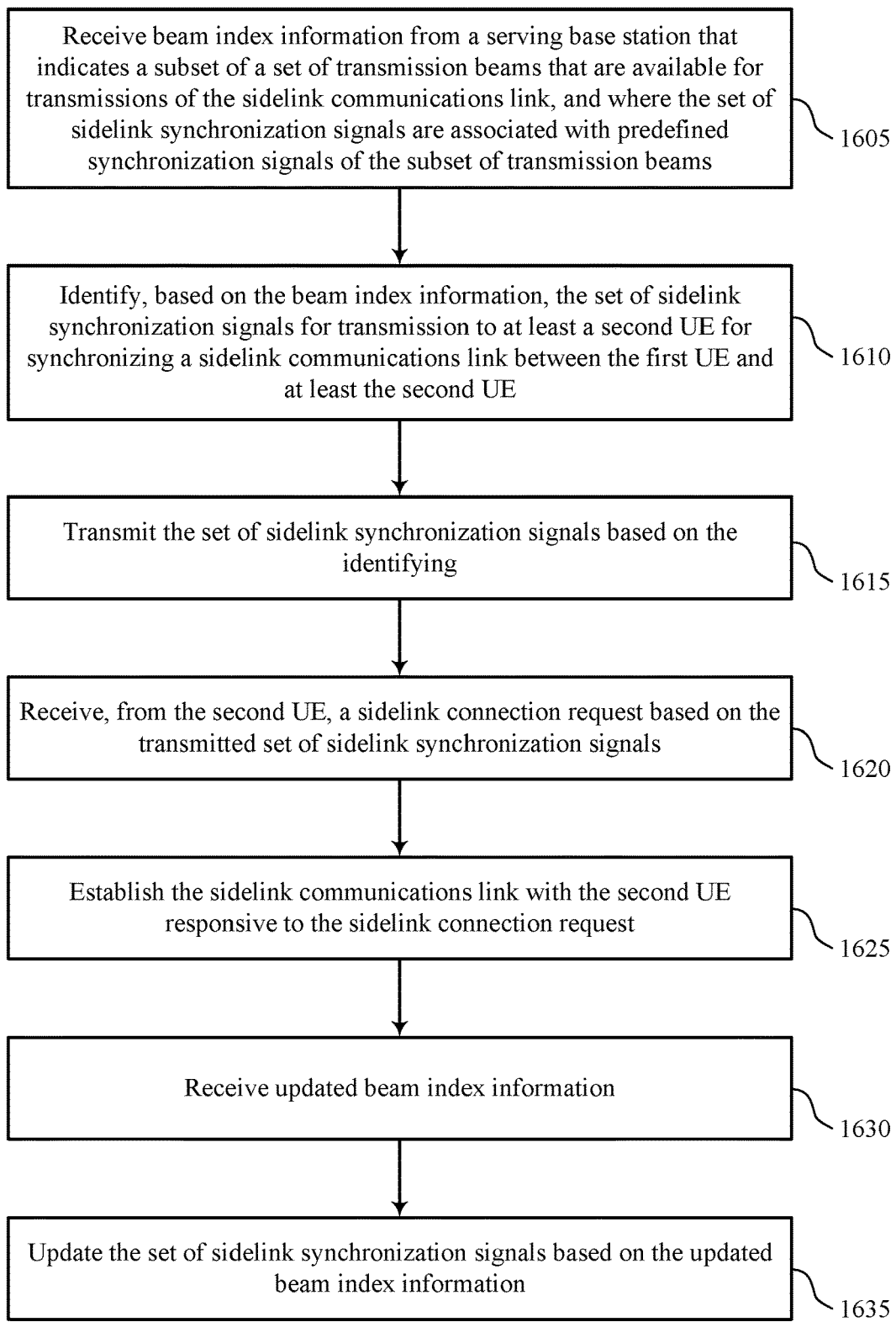

FIG. 16 shows a flowchart illustrating a method 1600 that supports device-to-device synchronization in wireless communications in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive beam index information from a serving base station that indicates a subset of a set of transmission beams that are available for transmissions of the sidelink communications link, and where the set of sidelink synchronization signals are associated with predefined synchronization signals of the subset of transmission beams. The operations of 1605 may be performed according to the methods described herein. In some examples, aspects of the operations of 1605 may be performed by a sidelink synchronization manager as described with reference to FIGS. 7 through 10. In some cases, the beam index information is provided in a bit mask that indicates the subset of transmission beams or in a synchronization raster that indicates the subset of transmission beams.

At 1610, the UE may identify, based on the beam index information, the set of sidelink synchronization signals for transmission to at least a second UE for synchronizing a sidelink communications link between the first UE and at least the second UE. The operations of 1610 may be performed according to the methods described herein. In some examples, aspects of the operations of 1610 may be performed by a sidelink synchronization manager as described with reference to FIGS. 7 through 10.

At 1615, the UE may transmit the set of sidelink synchronization signals based on the identifying. The operations of 1615 may be performed according to the methods described herein. In some examples, aspects of the operations of 1615 may be performed by a sidelink transmission manager as described with reference to FIGS. 7 through 10.

At 1620, the UE may receive, from the second UE, a sidelink connection request based on the transmitted set of sidelink synchronization signals. The operations of 1620 may be performed according to the methods described herein. In some examples, aspects of the operations of 1620 may be performed by a sidelink random access manager as described with reference to FIGS. 7 through 10.

At 1625, the UE may establish the sidelink communications link with the second UE responsive to the sidelink connection request. The operations of 1625 may be performed according to the methods described herein. In some examples, aspects of the operations of 1625 may be performed by a sidelink connection establishment manager as described with reference to FIGS. 7 through 10.

At 1630, the UE may receive updated beam index information. The operations of 1630 may be performed according to the methods described herein. In some examples, aspects of the operations of 1630 may be performed by a sidelink configuration manager as described with reference to FIGS. 7 through 10.

At 1635, the UE may update the set of sidelink synchronization signals based on the updated beam index information. The operations of 1635 may be performed according to the methods described herein. In some examples, aspects of the operations of 1635 may be performed by a sidelink configuration manager as described with reference to FIGS. 7 through 10.

Figure 17:
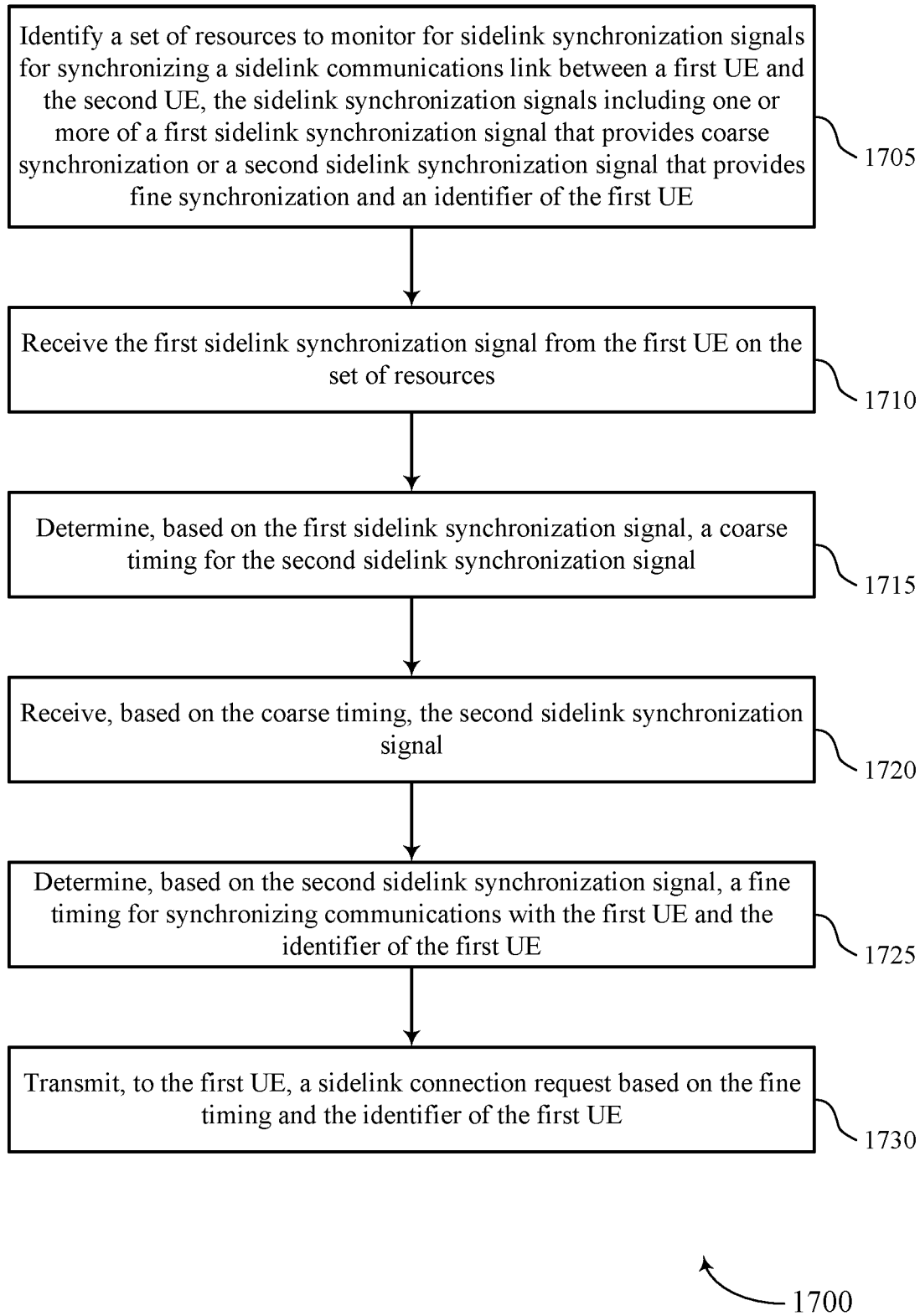

FIG. 17 shows a flowchart illustrating a method 1700 that supports device-to-device synchronization in wireless communications in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may identify a set of resources to monitor for sidelink synchronization signals for synchronizing a sidelink communications link between a first UE and the second UE, the sidelink synchronization signals including one or more of a first sidelink synchronization signal that provides coarse synchronization or a second sidelink synchronization signal that provides fine synchronization and an identifier of the first UE. The operations of 1705 may be performed according to the methods described herein. In some examples, aspects of the operations of 1705 may be performed by a sidelink synchronization manager as described with reference to FIGS. 7 through 10.

At 1710, the UE may receive the first sidelink synchronization signal from the first UE on the set of resources. The operations of 1710 may be performed according to the methods described herein. In some examples, aspects of the operations of 1710 may be performed by a sidelink synchronization manager as described with reference to FIGS. 7 through 10.

At 1715, the UE may determine, based on the first sidelink synchronization signal, a coarse timing for the second sidelink synchronization signal. The operations of 1715 may be performed according to the methods described herein. In some examples, aspects of the operations of 1715 may be performed by a sidelink synchronization manager as described with reference to FIGS. 7 through 10.

At 1720, the UE may receive, based on the coarse timing, the second sidelink synchronization signal. The operations of 1720 may be performed according to the methods described herein. In some examples, aspects of the operations of 1720 may be performed by a sidelink synchronization manager as described with reference to FIGS. 7 through 10.

At 1725, the UE may determine, based on the second sidelink synchronization signal, a fine timing for synchronizing communications with the first UE and the identifier of the first UE. The operations of 1725 may be performed according to the methods described herein. In some examples, aspects of the operations of 1725 may be performed by a sidelink synchronization manager as described with reference to FIGS. 7 through 10.

At 1730, the UE may transmit, to the first UE, a sidelink connection request based on the fine timing and the identifier of the first UE. The operations of 1730 may be performed according to the methods described herein. In some examples, aspects of the operations of 1730 may be performed by a sidelink random access manager as described with reference to FIGS. 7 through 10.

Figure 18:
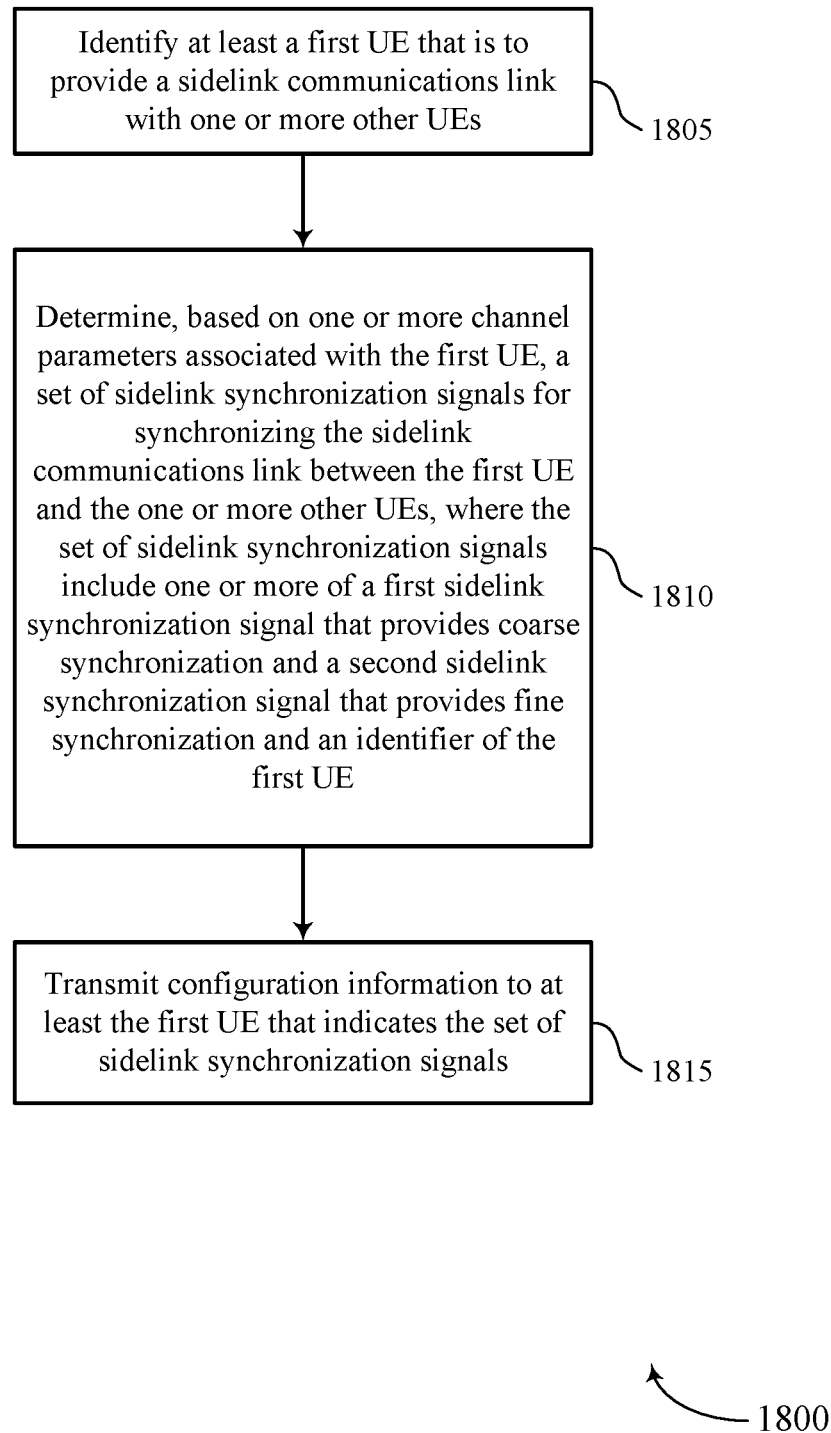

FIG. 18 shows a flowchart illustrating a method 1800 that supports device-to-device synchronization in wireless communications in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may identify at least a first UE that is to provide a sidelink communications link with one or more other UEs. The operations of 1805 may be performed according to the methods described herein. In some examples, aspects of the operations of 1805 may be performed by a sidelink configuration manager as described with reference to FIGS. 11 through 14.

At 1810, the base station may determine, based on one or more channel parameters associated with the first UE, a set of sidelink synchronization signals for synchronizing the sidelink communications link between the first UE and the one or more other UEs, where the set of sidelink synchronization signals include first sidelink synchronization signal that provides coarse synchronization and a second sidelink synchronization signal that provides fine synchronization and an identifier of the first UE. The operations of 1810 may be performed according to the methods described herein. In some examples, aspects of the operations of 1810 may be performed by a sidelink synchronization manager as described with reference to FIGS. 11 through 14.

At 1815, the base station may transmit configuration information to at least the first UE that indicates the set of sidelink synchronization signals. The operations of 1815 may be performed according to the methods described herein. In some examples, aspects of the operations of 1815 may be performed by a sidelink configuration manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein. Thus, example 1 is a method for wireless communication at a first UE including: identifying a set of sidelink synchronization signals for transmission to at least a second UE for synchronizing a sidelink communications link between the first UE and at least the second UE, the set of sidelink synchronization signals including one or more of a first sidelink synchronization signal that provides coarse synchronization or a second sidelink synchronization signal that provides fine synchronization and an identifier of the first UE, transmitting the set of sidelink synchronization signals based at least in part on the identifying, receiving, from the second UE, a sidelink connection request based at least in part on the transmitted set of sidelink synchronization signals, and establishing the sidelink communications link with the second UE responsive to the sidelink connection request.

In example 2, the method of example 1 may include: receiving, from a serving base station of the first UE, configuration information that indicates the set of sidelink synchronization signals. In example 3, in the method of examples 1-2 the set of sidelink synchronization signals further include a physical broadcast channel transmission that provides system information for the sidelink communications link.

In example 4, in the method of examples 1-3, the first sidelink synchronization signal is a first sounding reference signal having a first reference signal sequence that provides the coarse synchronization, and the second sidelink synchronization signal is a second reference signal having a second reference signal sequence that is selected from a set of available sounding reference signal sequences to provide the identifier of the first UE and to provide the fine synchronization. In example 5, in the method of example 4, the first reference signal sequence is selected from a first subset of available reference signal sequences that provide the coarse synchronization, and the second reference signal sequence is selected from a second subset of available reference signal sequences, and where the first reference signal sequence is associated with a range of cell identifications configured for sidelink communications, and the second reference signal sequence is associated with a specific cell identification within the range of cell identifications.

In example 6, in the method of examples 1-3, the first sidelink synchronization signal is a primary synchronization signal and the second sidelink synchronization signal is a secondary synchronization signal. In example 7, in the method of example 6, wherein the primary synchronization signal is associated with a range of cell identifications configured for sidelink communications, and the secondary synchronization signal is associated with a specific cell identification within the range of cell identifications.

In example 8, in the method of examples 1-7, physical resources to be used at the first UE for transmission of the set of sidelink synchronization signals are provided in a signal structure configured by a serving base station, and wherein the first sidelink synchronization signal and the second sidelink synchronization signal are determined based at least in part on the indicated physical resources. In example 9, in the method of example 8 the physical resources indicated in the configuration information include an indication of symbols for transmission of the first sidelink synchronization signal, the second sidelink synchronization signal, and physical broadcast channel information.

In example 10, in the method of examples 1-9, the identifying may include receiving beam index information from a serving base station that indicates a subset of a set of transmission beams that are available for transmissions of the sidelink communications link, and wherein the set of sidelink synchronization signals are associated with pre-defined synchronization signals of the subset of transmission beams. In example 11, in the method of example 10, the beam index information is provided in a bit mask that indicates the subset of transmission beams or in a synchronization raster that indicates the subset of transmission beams. In example 12, in the method of examples 10-11, the identifying may further include: receiving updated beam index information, and updating the set of sidelink synchronization signals based at least in part on the updated beam index information. In example 13, in the method of examples 10-12, the beam index information is provided in an indication of random access resources that are available for the sidelink connection request that each have an associated beam.

In example 14, in the method of examples 1-13, the identifying may include: receiving, from a serving base station, an indication of a time window for device discovery and measurement, and wherein the set of sidelink synchronization signals is determined based at least in part on the time window. In example 15, the method of examples 1-14 may further include: determining that an updated set of sidelink synchronization signals are to be transmitted based at least in part on one or more updated QCL parameters of the first UE, and transmitting an indication of the updated set of sidelink synchronization signals to at least one of the second UE or a base station. In example 16, the method of examples 1-16 may further include: determining, at the first UE, a mobility state of the first UE, wherein the set of synchronization signals is based at least in part on the mobility state, and transmitting an indication of the mobility state to one or more of the second UE or a base station.

Example 17 is a method for wireless communication at a second UE, including: identifying a set of resources to monitor for sidelink synchronization signals for synchronizing a sidelink communications link between a first UE and the second UE, the sidelink synchronization signals including one or more of a first sidelink synchronization signal that provides coarse synchronization or a second sidelink synchronization signal that provides fine synchronization and an identifier of the first UE, receiving the first sidelink synchronization signal from the first UE on the set of resources, determining, based at least in part on the first sidelink synchronization signal, a coarse timing for the second sidelink synchronization signal, receiving, based at least in part on the coarse timing, the second sidelink synchronization signal, determining, based at least in part on the second sidelink synchronization signal, a fine timing for synchronizing communications with the first UE and the identifier of the first UE, and transmitting, to the first UE, a sidelink connection request based at least in part on the fine timing and the identifier of the first UE.

In example 18, in the method of example 17, the identifying may include: receiving, from a serving base station of the first UE, configuration information that indicates a configuration of the sidelink synchronization signals. In example 19, in the method of examples 17-18, the sidelink synchronization signals further include a physical broadcast channel transmission that provides system information for the sidelink communications link.

In example 20, in the method of examples 17-19, the first sidelink synchronization signal is a first sounding reference signal having a first reference signal sequence that provides the coarse synchronization, and the second sidelink synchronization signal is a second reference signal having a second reference signal sequence that is selected from a set of available sounding reference signal sequences to provide the identifier of the first UE and to provide the fine synchronization.

In example 21, in the method of examples 17-19, the first sidelink synchronization signal is a primary synchronization signal and the second sidelink synchronization signal is a secondary synchronization signal. In example 22, in the method of example 21, the primary synchronization signal is associated with a range of cell identifications configured for sidelink communications, and the secondary synchronization signal is associated with a specific cell identification within the range of cell identifications.

In example 23, in the method of examples 17-22, physical resources to be used at the first UE for transmission of the set of sidelink synchronization signals are provided in a signal structure configured by a serving base station, and where the set of resources is determined based at least in part on the indicated physical resources. In example 24, in the method of example 23, the physical resources indicated in the configuration information include an indication of symbols for transmission of the first sidelink synchronization signal, the second sidelink synchronization signal, and physical broadcast channel information.

In example 25, in the method of examples 17-24, the identifying may include: receiving beam index information from a serving base station that indicates a subset of a set of transmission beams that are available for transmissions of the sidelink communications link, and where the sidelink synchronization signals are associated with predefined synchronization signals of the subset of transmission beams. In example 26, in the method of example 25, the beam index information is provided in a bit mask that indicates the subset of transmission beams or in a synchronization raster that indicates the subset of transmission beams. In example 27, in the method of examples 25-26, the identifying may further include: receiving updated beam index information, and updating the set of sidelink synchronization signals based at least in part on the updated beam index information. In example 28, in the method of examples 25-27, the beam index information is provided in an indication of random access resources that are available for the sidelink connection request that each have an associated beam.

In example 29, in the method of examples 17-28, the identifying may include: receiving, from a serving base station, an indication of a time window for device discovery and measurement, and where the set of resources is determined based at least in part on the time window. In example 30, the method of examples 17-29 may further include: receiving, from the first UE or a base station, an indication that an updated set of sidelink synchronization signals are to be transmitted based at least in part on one or more updated QCL parameters of the first UE, and updating the set of resources based at least in part on the updated set of sidelink synchronization signals. In example 31, the method of examples 17-30 may further include: receiving, from the first UE or a base station, an indication of a mobility state of the first UE, and determining the set of resources to monitor for sidelink synchronization signals based at least in part on the mobility state.

Example 32 is a method for wireless communication at a base station, including: identifying at least a first UE that is to provide a sidelink communications link with one or more other UEs, determining, based at least in part on one or more channel parameters associated with the first UE, a set of sidelink synchronization signals for synchronizing the sidelink communications link between the first UE and the one or more other UEs, where the set of sidelink synchronization signals include first sidelink synchronization signal that provides coarse synchronization and a second sidelink synchronization signal that provides fine synchronization and an identifier of the first UE, and transmitting configuration information to at least the first UE that indicates the set of sidelink synchronization signals.

In example 33, in the method of example 32, the set of sidelink synchronization signals further include a physical broadcast channel transmission that provides system information for the sidelink communications link.

In example 34, in the method of examples 32-33, the first sidelink synchronization signal is a first sounding reference signal having a first reference signal sequence that provides the coarse synchronization, and the second sidelink synchronization signal is a second reference signal having a second reference signal sequence that is selected from a set of available sounding reference signal sequences to provide the identifier of the first UE and to provide the fine synchronization. In example 35, in the method of example 34, the first reference signal sequence is selected from a first subset of available reference signal sequences that provide the coarse synchronization, and the second reference signal sequence is selected from a second subset of available reference signal sequences, and where the first reference signal sequence is associated with a range of cell identifications configured for sidelink communications, and the second reference signal sequence is associated with a specific cell identification within the range of cell identifications.

In example 36, in the method of examples 32-33, the first sidelink synchronization signal is a primary synchronization signal and the second sidelink synchronization signal is a secondary synchronization signal. In example 37, in the method of example 36, the primary synchronization signal is associated with a range of cell identifications configured for sidelink communications, and the secondary synchronization signal is associated with a specific cell identification within the range of cell identifications.

In example 38, in the method of examples 32-37, the configuration information provides a signal structure that indicates physical resources to be used at the first UE for transmission of the set of sidelink synchronization signals, and where the set of sidelink synchronization signals are determined based at least in part on the indicated physical resources. In example 39, in the method of example 38, the physical resources indicated in the configuration information include an indication of symbols for transmission of the first sidelink synchronization signal, the second sidelink synchronization signal, and physical broadcast channel information.

In example 40, in the method of examples 32-39, the set of sidelink synchronization signals include one or more of a sounding reference signal, a primary synchronization signal, a secondary synchronization signal, a physical broadcast channel signal, a channel state information reference signal, or a control channel signal.

In example 41, in the method of examples 32-40, the configuration information provides beam index information that indicates a subset of a set of transmission beams that are available for transmissions of the sidelink communications link, and where the set of sidelink synchronization signals are associated with synchronization signals of the subset of transmission beams. In example 42, in the method of example 41, the beam index information is provided in a bit mask that indicates the subset of transmission beams or in a synchronization raster that indicates the subset of transmission beams. In example 43, the method of examples 41-42 may further include: receiving, from the first UE, updated channel information, determining, based at least in part on the updated channel information, updated beam index information, and transmitting the updated beam index information to at least the first UE. In example 44, in the method of examples 41-43, the beam index information is provided in an indication of random access resources that are available for sidelink connection requests used to establish the sidelink communications link. In example 45, in the method of example 44, the random access resources include a plurality of random access resources that each have an associated beam.

In example 46, in the method of examples 32-45, the configuration information provides an indication of a time window for device discovery and measurement, and where the set of sidelink synchronization signals is determined based at least in part on the time window. In example 47, in the method of examples 32-46, the one or more channel parameters include one or more of a mobility state of the first UE, a direction of movement of the first UE, a transmit timing of the base station and the first UE, or a number of UEs that are enabled to establish a sidelink communications link.

Example 48 is a system or apparatus including means for implementing a method or realizing an apparatus as in any of examples 1-47.

Example 49 is a non-transitory computer-readable medium storing instructions executable by one or more processors to cause the one or more processors to implement a method as in any of examples 1-47.

Example 50 is a system including one or more processors and memory in electronic communication with the one or more processors storing instructions executable by the one or more processors to cause the system or apparatus to implement a method as in any of examples 1-47.

Aspects of these examples may be combined with aspects or embodiments disclosed in other implementations.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
   receiving beam index information from a serving network device that indicates a subset of a set of transmission beams that are available for transmissions of a sidelink communications link, wherein the beam index information is received in an indication of random access resources that are available for a sidelink connection request that each have an associated beam;
   transmitting a set of sidelink synchronization signals based at least in part on identifying the set of sidelink synchronization signals for transmission to at least a second UE for synchronizing the sidelink communications link between the first UE and at least the second UE, the set of sidelink synchronization signals including one or more of a first sidelink synchronization signal that provides coarse synchronization or a second sidelink synchronization signal that provides fine synchronization and an identifier of the first UE based at least in part on receiving the beam index information;
   receiving, from the second UE, the sidelink connection request based at least in part on the transmitted set of sidelink synchronization signals; and
   communicating to establish the sidelink communications link with the second UE responsive to the sidelink connection request.

2. The method of claim 1, wherein the set of sidelink synchronization signals are associated with predefined synchronization signals of the subset of transmission beams.

3. The method of claim 1, wherein the beam index information is received in a bit mask that indicates the subset of transmission beams or in a synchronization raster that indicates the subset of transmission beams.

4. The method of claim 1, further comprising:
   receiving updated beam index information; and
   updating the set of sidelink synchronization signals based at least in part on the updated beam index information, wherein identifying the set of sidelink synchronization signals is based at least in part on updating the set of sidelink synchronization signals.

5. The method of claim 1, further comprising:
   receiving, from the serving network device, an indication of a time window for device discovery and measurement, and wherein the set of sidelink synchronization signals is determined based at least in part on the time window, wherein identifying the set of sidelink synchronization signals is based at least in part on receiving the indication.

6. The method of claim 1, further comprising:
   determining that an updated set of sidelink synchronization signals are to be transmitted based at least in part on one or more updated quasi-co-location (QCL) parameters of the first UE; and
   transmitting an indication of the updated set of sidelink synchronization signals to at least one of the second UE or a network device.

7. The method of claim 1, further comprising:
   determining, at the first UE, a mobility state of the first UE, wherein the set of sidelink synchronization signals is based at least in part on the mobility state; and
   transmitting an indication of the mobility state to one or more of the second UE or a network device.

8. The method of claim 1, further comprising:
   receiving, from the serving network device of the first UE, configuration information that indicates the set of sidelink synchronization signals, wherein identifying the set of sidelink synchronization signals is based at least in part on receiving the configuration information.

9. The method of claim 1, wherein the set of sidelink synchronization signals further include a physical broadcast channel transmission that provides system information for the sidelink communications link.

10. The method of claim 1, wherein the first sidelink synchronization signal is a first sounding reference signal having a first reference signal sequence that provides the coarse synchronization, and the second sidelink synchronization signal is a second reference signal having a second reference signal sequence that is selected from a set of available sounding reference signal sequences to provide the identifier of the first UE and to provide the fine synchronization.

11. The method of claim 1, wherein the first sidelink synchronization signal is a primary synchronization signal and the second sidelink synchronization signal is a secondary synchronization signal.

12. The method of claim 1, wherein:
physical resources to be used at the first UE for transmission of the set of sidelink synchronization signals are indicated in a signal structure configured by the serving network device, and wherein the first sidelink synchronization signal and the second sidelink synchronization signal are determined based at least in part on the indicated physical resources.

13. An apparatus for wireless communication at a first user equipment (UE), comprising:
a processor;
memory coupled with the processor; and
instructions stored in the memory and executable by the processor to cause the apparatus to, based at least in part on the one or more instructions:
receive beam index information from a serving network device that indicates a subset of a set of transmission beams that are available for transmissions of a sidelink communications link, wherein the beam index information is received in an indication of random access resources that are available for a sidelink connection request that each have an associated beam;
transmit a set of sidelink synchronization signals based at least in part on identifying the set of sidelink synchronization signals for transmission to at least a second UE for synchronizing the sidelink communications link between the first UE and at least the second UE, the set of sidelink synchronization signals including one or more of a first sidelink synchronization signal that provides coarse synchronization or a second sidelink synchronization signal that provides fine synchronization and an identifier of the first UE based at least in part on receiving the beam index information;
receive, from the second UE, the sidelink connection request based at least in part on the transmitted set of sidelink synchronization signals; and
communicate to establish the sidelink communications link with the second UE responsive to the sidelink connection request.

14. The apparatus of claim 13, wherein the set of sidelink synchronization signals are associated with predefined synchronization signals of the subset of transmission beams.

15. The apparatus of claim 13, wherein the beam index information is received in a bit mask that indicates the subset of transmission beams or in a synchronization raster that indicates the subset of transmission beams.

16. The apparatus of claim 13, wherein the instructions are further executable by the processor to cause the apparatus to, based at least in part on the one or more instructions:
receive updated beam index information; and
update the set of sidelink synchronization signals based at least in part on the updated beam index information, wherein identifying the set of sidelink synchronization signals is based at least in part on updating the set of sidelink synchronization signals.

17. The apparatus of claim 13, wherein the instructions are executable by the processor to cause the apparatus to, based at least in part on the one or more instructions:
receive, from the serving network device, an indication of a time window for device discovery and measurement, and wherein the set of sidelink synchronization signals is determined based at least in part on the time window, wherein identifying the set of sidelink synchronization signals is based at least in part on receiving the indication.

18. The apparatus of claim 13, wherein the instructions are further executable by the processor to cause the apparatus to, based at least in part on the one or more instructions:
determine that an updated set of sidelink synchronization signals are to be transmitted based at least in part on one or more updated quasi-co-location (QCL) parameters of the first UE; and
transmit an indication of the updated set of sidelink synchronization signals to at least one of the second UE or a network device.

19. The apparatus of claim 13, wherein the instructions are further executable by the processor to cause the apparatus to, based at least in part on the one or more instructions:
determine, at the first UE, a mobility state of the first UE, wherein the set of sidelink synchronization signals is based at least in part on the mobility state; and
transmit an indication of the mobility state to one or more of the second UE or a network device.

20. The apparatus of claim 13, wherein the instructions are executable by the processor to cause the apparatus to, based at least in part on the one or more instructions:
receive, from the serving network device of the first UE, configuration information that indicates the set of sidelink synchronization signals, wherein identifying the set of sidelink synchronization signals is based at least in part on receiving the configuration information.

21. The apparatus of claim 13, wherein the set of sidelink synchronization signals further include a physical broadcast channel transmission that provides system information for the sidelink communications link.

22. The apparatus of claim 13, wherein the first sidelink synchronization signal is a first sounding reference signal having a first reference signal sequence that provides the coarse synchronization, and the second sidelink synchronization signal is a second reference signal having a second reference signal sequence that is selected from a set of available sounding reference signal sequences to provide the identifier of the first UE and to provide the fine synchronization.

23. The apparatus of claim 13, wherein the first sidelink synchronization signal is a primary synchronization signal and the second sidelink synchronization signal is a secondary synchronization signal.

24. The apparatus of claim 13, wherein physical resources to be used at the first UE for transmission of the set of sidelink synchronization signals are indicated in a signal structure configured by the serving network device, and wherein the first sidelink synchronization signal and the second sidelink synchronization signal are determined based at least in part on the indicated physical resources.

25. An apparatus for wireless communication at a first user equipment (UE), comprising:
means for receiving beam index information from a serving network device that indicates a subset of a set of transmission beams that are available for transmissions of a sidelink communications link, wherein the beam index information is received in an indication of random access resources that are available for a sidelink connection request that each have an associated beam;
means for transmitting a set of sidelink synchronization signals based at least in part on identifying the set of sidelink synchronization signals for transmission to at least a second UE for synchronizing the sidelink communications link between the first UE and at least the second UE, the set of sidelink synchronization signals including one or more of a first sidelink synchronization signal that provides coarse synchronization or a second sidelink synchronization signal that provides fine synchronization and an identifier of the first UE based at least in part on receiving the beam index information;

means for receiving, from the second UE, the sidelink connection request based at least in part on the transmitted set of sidelink synchronization signals; and means for communicating to establish the sidelink communications link with the second UE responsive to the sidelink connection request.

26. The apparatus of claim 25, wherein the set of sidelink synchronization signals are associated with predefined synchronization signals of the subset of transmission beams.

27. The apparatus of claim 25, wherein the beam index information is received in a bit mask that indicates the subset of transmission beams or in a synchronization raster that indicates the subset of transmission beams.

28. A non-transitory computer-readable medium storing code for wireless communication at a first user equipment (UE), the code comprising instructions executable by a processor to:

receive beam index information from a serving network device that indicates a subset of a set of transmission beams that are available for transmissions of a sidelink communications link, wherein the beam index information is received in an indication of random access resources that are available for a sidelink connection request that each have an associated beam;

transmit a set of sidelink synchronization signals based at least in part on identifying the set of sidelink synchronization signals for transmission to at least a second UE for synchronizing the sidelink communications link between the first UE and at least the second UE, the set of sidelink synchronization signals including one or more of a first sidelink synchronization signal that provides coarse synchronization or a second sidelink synchronization signal that provides fine synchronization and an identifier of the first UE based at least in part on receiving the beam index information;

receive, from the second UE, the sidelink connection request based at least in part on the transmitted set of sidelink synchronization signals; and communicate to establish the sidelink communications link with the second UE responsive to the sidelink connection request.

29. The non-transitory computer-readable medium of claim 28, wherein the set of sidelink synchronization signals are associated with predefined synchronization signals of the subset of transmission beams.

30. The non-transitory computer-readable medium of claim 28, wherein the beam index information is received in a bit mask that indicates the subset of transmission beams or in a synchronization raster that indicates the subset of transmission beams.

* * * * *